(12) United States Patent
Stoffel

(10) Patent No.: US 11,541,843 B1
(45) Date of Patent: Jan. 3, 2023

(54) NONSPECIFIC VEHICLE

(71) Applicant: Zoox, Inc., Foster City, CA (US)

(72) Inventor: Christopher John Stoffel, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 567 days.

(21) Appl. No.: 16/578,205

(22) Filed: Sep. 20, 2019

(51) Int. Cl.
*B60R 25/20* (2013.01)
*G05D 1/02* (2020.01)
*B60R 25/00* (2013.01)
*G07C 9/00* (2020.01)
*G06Q 50/30* (2012.01)

(52) U.S. Cl.
CPC ............ *B60R 25/20* (2013.01); *B60R 25/002* (2013.01); *G05D 1/021* (2013.01); *G06Q 50/30* (2013.01); *G07C 9/00309* (2013.01); *B60R 2325/20* (2013.01); *G07C 2009/00539* (2013.01)

(58) Field of Classification Search
CPC ...... B60R 25/20; B60R 25/002; G05D 1/021; G06Q 50/30; G07C 9/00309
USPC .......................................................... 701/36
See application file for complete search history.

(56) References Cited

U.S. PATENT DOCUMENTS

| | | | |
|---|---|---|---|
| 9,612,123 B1 | 4/2017 | Levinson et al. | |
| 9,971,348 B1* | 5/2018 | Canavor | H04W 12/068 |
| 10,353,390 B2 | 7/2019 | Linscott et al. | |
| 2010/0280884 A1 | 11/2010 | Levine et al. | |
| 2016/0027307 A1 | 1/2016 | Abhyanker et al. | |
| 2016/0307288 A1 | 10/2016 | Yehuda et al. | |
| 2018/0293687 A1 | 10/2018 | Hardee et al. | |
| 2018/0322420 A1 | 11/2018 | Marco et al. | |
| 2018/0376357 A1 | 12/2018 | Tavares Coutinho et al. | |
| 2019/0049242 A1 | 2/2019 | Adams et al. | |
| 2019/0049566 A1 | 2/2019 | Adams et al. | |
| 2019/0066003 A1* | 2/2019 | Dyer | G06Q 50/10 |
| 2019/0318159 A1* | 10/2019 | Blanc-Paques | G06Q 50/30 |
| 2019/0340546 A1* | 11/2019 | Goldman-Shenhar | G01C 21/3423 |
| 2020/0065722 A1* | 2/2020 | Smith | H04W 4/023 |
| 2020/0160705 A1 | 5/2020 | Chase | |
| 2020/0378771 A1* | 12/2020 | Beaurepaire | G01C 21/3461 |

(Continued)

OTHER PUBLICATIONS

Office Action for U.S. Appl. No. 16/578,195, dated Feb. 4, 2022, Stoffel, "Network-Based Control of Nonspecific Vehicle", 26 Pages.

(Continued)

*Primary Examiner* — Kerri L McNally
(74) *Attorney, Agent, or Firm* — Lee & Hayes, P.C.

(57) ABSTRACT

A vehicle capable of being utilized by users other than a user assigned to the vehicle is described herein. Such a vehicle may operate in various modes, including a first mode in which the vehicle allows additional users to utilize the vehicle and a second mode in which the vehicle prohibits additional users from utilizing the vehicle. A vehicle may transition from the first mode to the second mode based on various environmental factors, such as, but not limited to, vehicle demand, geolocation, and the like. When operating in a mode in which the vehicle can be utilized by users other than a user assigned to the vehicle, a user who may have been assigned a different vehicle may utilize the vehicle when proximate to the vehicle. Trip information and other details may be provided to the vehicle for transport of the user.

20 Claims, 12 Drawing Sheets

(56) References Cited

U.S. PATENT DOCUMENTS

2021/0075594 A1   3/2021   Hassani et al.

OTHER PUBLICATIONS

Office Action for U.S. Appl. No. 16/578,195, dated Jun. 14, 2021, Stoffel, "Network-Based Control of Nonspecific Vehicle", 27 pages.
Office Action for U.S. Appl. No. 16/578,195, dated Jun. 13, 2022, Stoffel, "Network-Based Control of Nonspecific Vehicle", 23 pages.

* cited by examiner

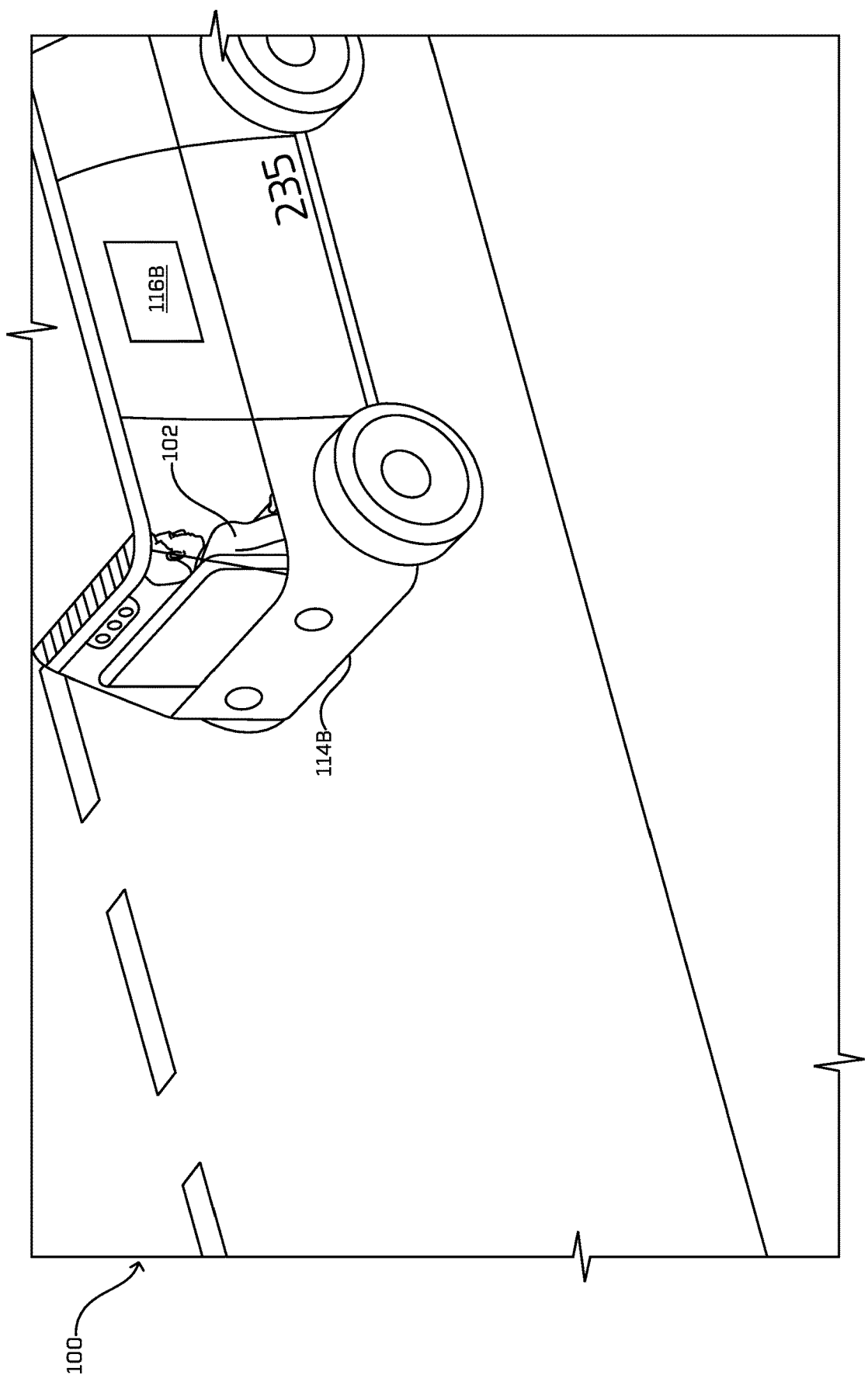

NONSPECIFIC VEHICLE

BACKGROUND

Transportation service providers can provide ride-hailing services whereby a user can request a ride from a first location to a second location, for example, via an application on a user device. A vehicle can be assigned to the user, such that when the vehicle arrives the user enters the vehicle and the driver can transport the user (now, a passenger) from the first location to the second location.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1D illustrates the example environment from FIG. 1A, wherein the user is being transported by the vehicle associated with the nonspecific mode (e.g., instead of a vehicle originally assigned to the user), as described herein.

DETAILED DESCRIPTION

Figure 1A:
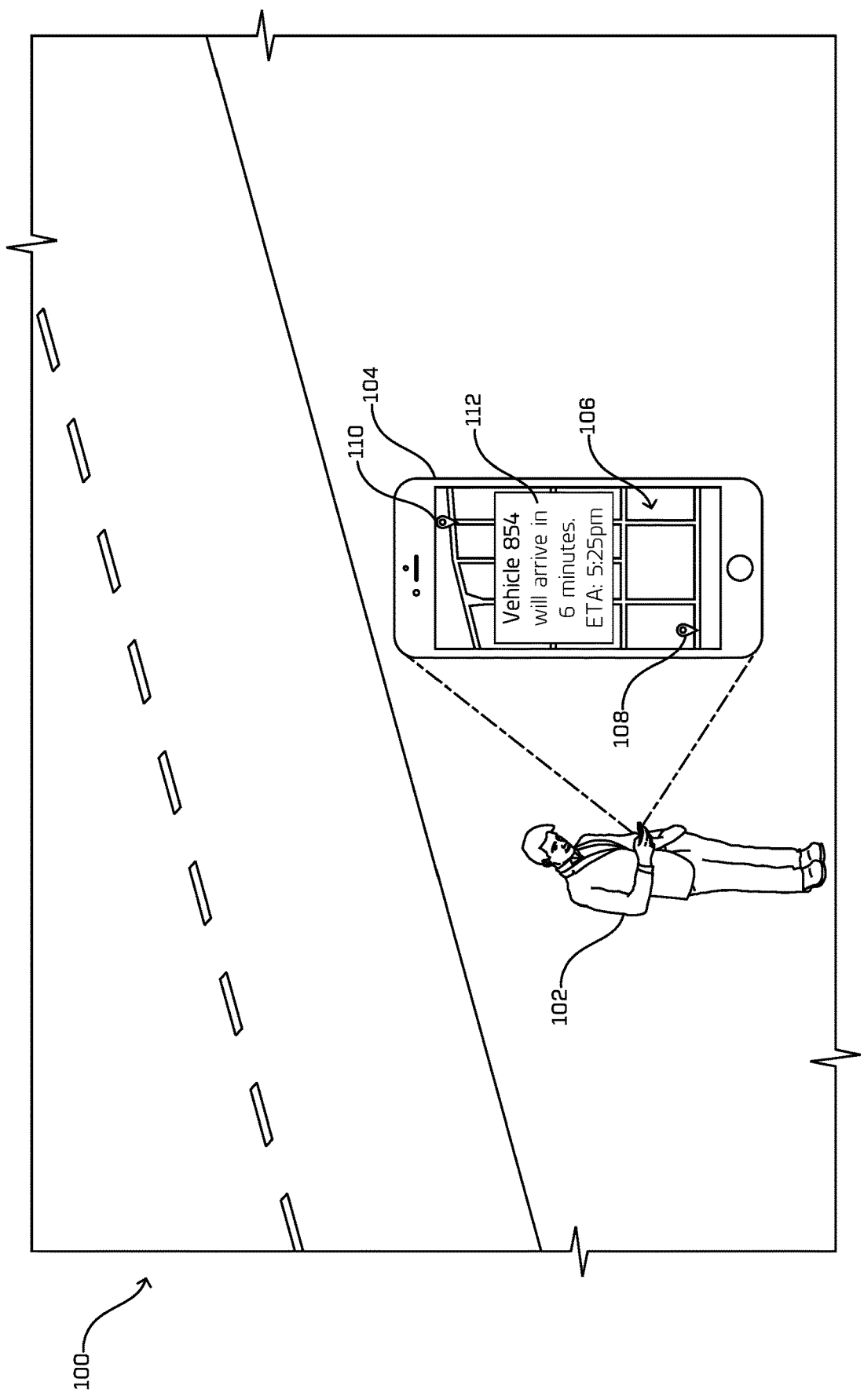
FIG. 1A illustrates an example environment wherein a user is requesting transportation services via an application on his user device, as described herein.

Techniques described herein relate to enabling a vehicle to transition from a specific mode—whereby a user assigned to the vehicle can claim the vehicle—to a nonspecific mode—whereby any user can claim the vehicle—and transportation techniques associated therewith. In at least one example, a vehicle associated with a service provider providing transportation services, can be associated with a nonspecific mode. While in the nonspecific mode, the vehicle can be claimed by a user who was not originally assigned to the vehicle. Responsive to the vehicle being utilized by the user who was not originally assigned to the vehicle, the service provider can send trip information corresponding to a trip associated with the user to the vehicle, and the vehicle can transport the user to their intended destination based at least in part on the trip information. That is, when a vehicle is associated with a nonspecific mode, a user can claim such a vehicle and the vehicle can transport the user to their intended destination, even though the vehicle was not originally assigned to the user.

For example, a user can request transportation services from a service provider associated with a fleet of vehicles capable of transporting users between locations. With the request, the user can provide at least an intended destination (e.g., a location where the user desires to be dropped off). A first vehicle can be assigned to a trip for transporting the user to the intended destination. For the purpose of this discussion, a "trip" is associated with an instruction or other indication for transporting a user from a first location (e.g., a pick-up location) to a second location (e.g., an intended destination). That is, the first vehicle can be assigned to the trip associated with the user and dispatched to a pickup location to pick up the user. Thus, the first vehicle can be assigned to, or otherwise associated with, the user. In some circumstances, such as where a large number of users are in a same location (or general area) and/or are requesting transportation services from the service provider (e.g., a concert, a festival, a sporting event, a transportation hub (e.g., train station, bus station, airport, etc.), etc.), multiple vehicles of the fleet of vehicles can be dispatched to the same location (or general area). Techniques described herein enable users to hail a ride from any of the vehicles in the location (or general area) for transportation, whether the vehicles are assigned to the users or not. For instance, when a second vehicle arrives at a pick-up location of the user, the user can claim the second vehicle—even though the second vehicle was not assigned to the user—and the second vehicle can receive trip information associated with the user based at least in part on the second vehicle being claimed by the user. In a similar manner, a user may walk up to any vehicle in a fleet (including before making such a request) and, upon authentication and entering the vehicle, can "claim" the vehicle, subsequently providing an intended destination.

For the purpose of this discussion, a vehicle can be "claimed" by a user when the trip associated with the user is associated with the vehicle such that the user can utilize and/or otherwise access the vehicle, as described below. In at least one example, the service provider can assign a trip to a vehicle responsive to receiving an indication that the user intends to claim the vehicle. For the purpose of this discussion, actions attributed to the service provider can be performed by one or more computing devices associated therewith. In some examples, the service provider can receive an identifier associated with a vehicle that a user intends to claim from a user device of the user. The receipt of such an identifier can indicate that the user intends to claim the vehicle. In some examples, a vehicle can receive an identifier associated with the user, a device of the user, and/or a trip associated with the user. The vehicle can receive such an identifier through various mechanisms, as described below. The vehicle can provide the identifier to the service provider. The receipt of such an identifier (e.g., from the vehicle and/or the user device of the user) can indicate that the user intends to claim the vehicle.

In at least one example, a user device of a user can be associated with an application that enables the user to request transportation services from the service provider. In at least one example, the application can store and/or have access to data associated with a profile of the user. For instance, such data can include a name of the user, demographic information associated with the user (e.g., birthdate, age, gender, home address, work address, occupation, etc.), an identifier associated with the user and/or user device, biometric information associated with a user (e.g., photo, fingerprint(s), retinal scan, ear shape, etc.), a rating associated with the user, preferences of the user, etc. Furthermore, in some examples, the service provider can send information associated with a trip (e.g., trip information) to the user device of the user. For instance, the service provider can send an estimated time of pick-up, an estimated time of arrival at the intended destination (e.g., drop-off location), identification information associated with the vehicle, and/or a trip identifier associated with a trip of a user to the user device of the user. The application can store the information, at least temporarily, and at least some of the trip information can be presented to the user (e.g., via a graphical user interface of the application and/or the vehicle).

In at least one example, the second vehicle can receive an identifier associated with the user, the user device of the user, and/or the trip from the application, for instance, via a network (e.g., WI-FI®, BLUETOOTH®, near-field communications (NFC), etc.). That is, based at least in part on the user being proximate to the second vehicle (e.g., close enough for the second vehicle to receive information from the application via the network), the second vehicle can receive the identifier from the application and via the network, send the identifier to the service provider, and can receive trip information corresponding to the trip from the service provider. In such an example, the service provider can indirectly receive the identifier from the application (e.g., via the second vehicle). The trip information provided to the vehicle can include the pick-up location, the intended destination (e.g., drop-off location), identification information associated with the user (e.g., a user identifier), a trip identifier, combinations of the foregoing, and the like.

In some examples, the second vehicle can receive an identifier associated with the user, the user device of the user, and/or the trip by reading, or otherwise capturing, the identifier or a code representing the identifier (e.g., a barcode, a quick response (QR) code) from the user device of the user. In such examples, the second vehicle can be associated with a reader device, an image capturing device, and/or other sensor to enable the second vehicle to capture the code and/or image data and provide the code and/or the image data to the service provider. In some examples, the user can interact with a display associated with the second vehicle to input the identifier and/or the user can interact with an audio system (e.g., microphones and/or speakers) associated with the second vehicle to provide the identifier to the second vehicle. In such examples, the second vehicle can send an indication of the identifier and/or audio data to the service provider, and the service provider can send trip information corresponding to the trip to the second vehicle.

Furthermore, in at least one example, the user can provide an identifier of the second vehicle to the application (or the application can capture the identifier of the second vehicle using a camera or other sensors) and the application can send such an identifier to the service provider. In such an example, the application can send an indication of the identifier and/or audio data to the service provider, and the service provider can send trip information corresponding to the trip to the second vehicle.

Based at least in part on receiving trip information corresponding to the trip, the second vehicle can transport the user to the intended destination (e.g., drop-off location) of the user. That is, computing system(s) associated with the second vehicle can control the second vehicle based at least in part on the trip information corresponding to the trip to transport the user to the intended destination (e.g., drop-off location) of the user. As a result, the first vehicle to which the trip associated with the user was originally assigned can be assigned a different trip associated with a different user.

Techniques described herein alleviate a significant point of friction for users in transportation networking environments that provide transportation services, as described herein. For example, with conventional techniques, users are assigned a particular vehicle and a user is required to wait for their assigned vehicle to arrive. If a user arrives at their pick-up location before their assigned vehicle, they are stuck waiting until their assigned vehicle has arrived (even if another vehicle capable of transporting the user to their intended destination (e.g., drop-off location) is available). Similarly, vehicles are assigned particular users and vehicles are required to wait for their assigned users to arrive. Thus, if a vehicle arrives at a pick-up location prior to their assigned user, the vehicle is stuck waiting until their assigned user arrives (even if other users are waiting for their assigned vehicles). This one-to-one, or in some cases, many-to-one, assignment scheme creates inefficiencies that are resolved by techniques described herein. Such inefficiencies are amplified in association with pick-up events where a plurality of vehicles are picking-up users in a same location, such as concerts, festivals, sporting events, transportation hubs (e.g., train stations, bus stations, airports, etc.), etc.). Techniques described herein enable any user to travel via a vehicle at a location, so long as the vehicle is associated with a nonspecific mode, and the vehicle can transport the user to their intended destination (e.g., drop-off location). Neither the user nor the vehicle needs to wait for their assigned vehicle or user, respectively. Thus, pick-up and traffic flow at concerts, festivals, sporting events, transportation hubs, etc. are significantly improved via techniques described herein.

The techniques described herein can be implemented in a number of ways. Example implementations are provided below with reference to the following figures. Example implementations are discussed in the context of autonomous vehicles; however, the methods, apparatuses, and systems described herein can be applied to a variety of systems (e.g., a sensor system or a robotic platform), and are not limited to autonomous vehicles. Additionally, the techniques described herein can be used with real data (e.g., captured using sensor(s)), simulated data (e.g., generated by a simulator), or any combination of the two.

FIG. 1A illustrates an example environment 100 wherein a user 102 is requesting transportation services via an application on his user device 104, as described herein.

In at least one example, the user 102 can interact with his user device 104, for example to set a pickup location for a trip, set a destination location for the trip, set details associated with the trip, control one or more features associated with a vehicle, navigate the vehicle from the pickup location to the destination location, pay for the trip, and/or the like.

To assist the user 102, an application executing on the user device 104 associated with the user 102 provides the user with a user interface. The user device 104 can comprise a phone, tablet, laptop, wearable, or any other computing device capable of being operated by the user 102.

In at least one example, the user 102 can utilize the user device 104 to hail a ride with a service provider that provides transportation services, such as ride-hailing services. In at least one example, the user device 104 can display a graphical user interface (GUI) 106 that includes a map representing a geographic area in which the user device 104 is located. In some examples, the user 102 can interact with the GUI 106 to indicate their location and/or, in some examples, designate a pick-up location. In some examples, the user 102 can input an address (e.g., via touch input, speech input, etc.) or otherwise provide an indication of the pick-up location. In some examples, the user device 104 can utilize one or more sensors (e.g., global positioning system (GPS)) to determine a location of the user device 104, which can be used to determine a pick-up location. In some examples, the user device 104 can mark the location of the user device 104 on the map and can associate the location of the user device 104 with a pick-up location. In some examples, the application can cause an indicator 108 to be presented via the GUI 106 to represent a pick-up location for the user 102.

The user 102 can interact with the GUI 106 to provide an intended destination (e.g., drop-off location). For example, the user 102 can interact with the GUI 106 via a touch input to indicate the intended destination (e.g., drop-off location). In another example, the user 102 can input an address (e.g., via touch input, speech input, etc.) or otherwise provide an indication of the intended destination (e.g., drop-off location). In at least one example, the application can cause an indicator 110 to be presented via the GUI 106 to represent the intended destination (e.g., drop-off location) for the user 102.

In at least one example, the application can send the pick-up location and/or the intended destination (e.g., drop-off location) to the service provider and the service provider can generate a trip for transporting the user 102 from the pick-up location to the intended destination (e.g., drop-off location). In at least one example, the trip can be associated with trip information which can include a pick-up location, an intended destination (e.g., drop-off location), identification information associated with the user (e.g., a user identifier), a trip identifier, etc. In at least one example, trip information can be associated with a profile of a user maintained by the service provider.

In some examples, the service provider can send trip information to the user device 104. For example, the service provider can send an estimated time of pick-up, an estimated time of arrival at the intended destination (e.g., drop-off location), identification information associated with the vehicle, and/or the identifier associated with the trip associated with the user 102 to the user device 104. In at least one example, the application can store the information, at least temporarily, and at least some of the information can be presented to the user 102, via the GUI 106. For example, in FIG. 1A, a user interface (UI) element 112 is presented via the GUI 106, which includes a vehicle identifier (e.g., Vehicle 854) of the vehicle assigned to the trip associated with the user 102 and an arrival time (6 minutes) and an estimated time of arrival (ETA) of 5:25 pm. Additional or alternative trip information can be presented via additional or alternative presentations, and the presentation in FIG. 1A is merely provided as a non-limiting example.

Additional details associated with the application and/or systems or methods for controlling vehicles via an application on a user device are described in U.S. patent application Ser. No. 16/119,987, filed on Aug. 31, 2018, the entire contents of which are incorporated by reference herein.

Figure 1B:
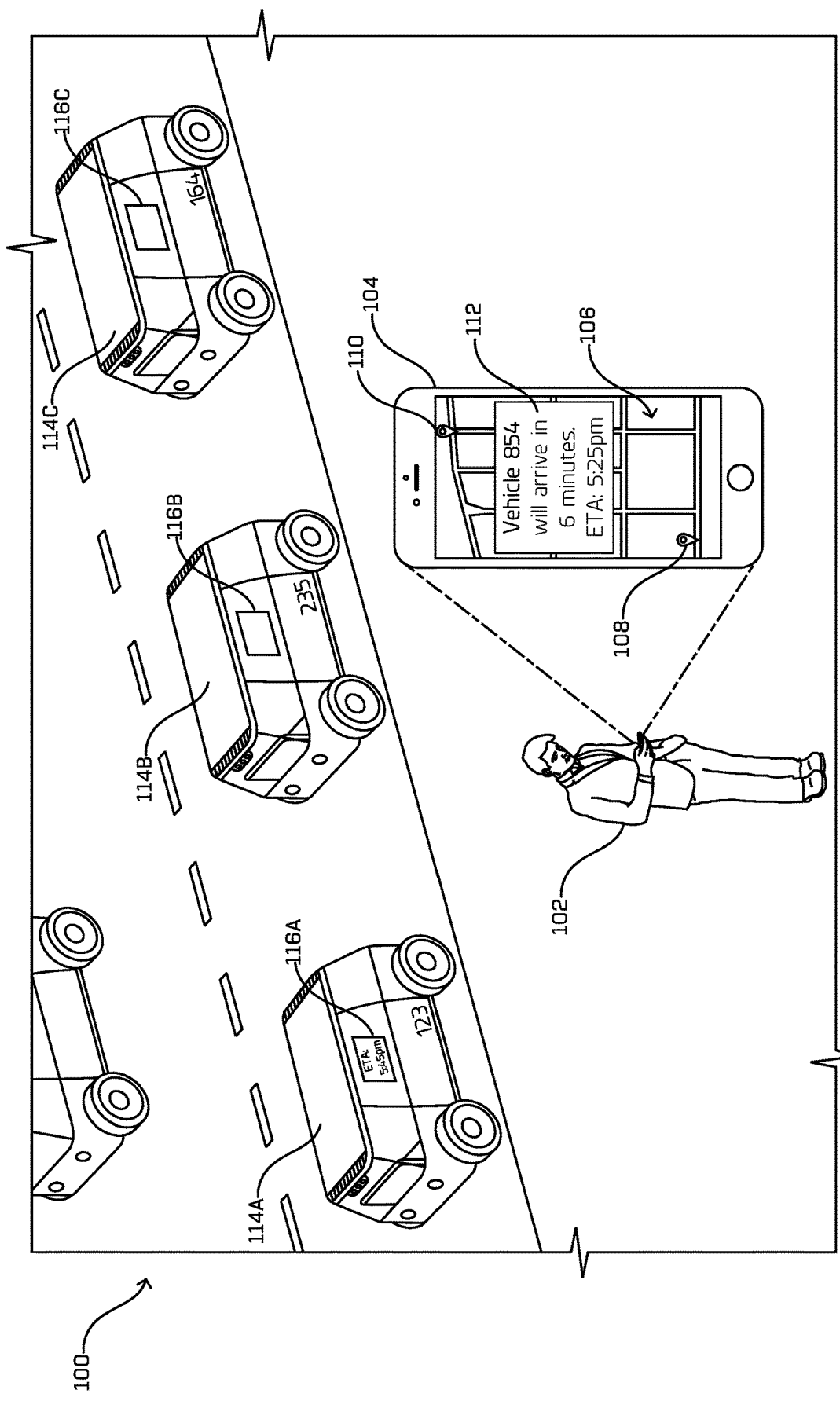
FIG. 1B illustrates the example environment from FIG. 1A, wherein multiple vehicles are present at a location of the user, as described herein.

FIG. 1B illustrates the example environment 100 from FIG. 1A, wherein multiple vehicles 114 are present in a same location as the user 102, as described herein. For purposes of this discussion, users, such as the user 102, and the vehicle(s) 114 can be "in a same location" if they are in the same general area. That is, a location can be associated with a geofenced area such that if the user 102 and the vehicle(s) 114 are within the geofenced area, the user 102 and the vehicle(s) 114 are in a same location. In some examples, a location can be associated with a threshold distance such that if the user 102 is within the threshold distance of a location and the vehicle(s) 114 are within a threshold distance of the location and/or the user 102 and the vehicle(s) 114 are within a threshold distance of one another, the user 102 and the vehicle(s) 114 are in a same location. That is, the user 102 and the vehicle(s) 114 need not be in an exact same location to be "in a same location" as described herein.

In at least one example, the user 102 can be in a location associated with an event, such as a concert, a festival, or a sporting event, or a transportation hub, such as a train station, bus station, airport, etc. In such an example, multiple users can be requesting transportation services from the same location. As such, multiple vehicles can be dispatched (e.g., by the service provider) to the same location. As illustrated in FIG. 1B, a first vehicle 114A (e.g., Vehicle 123), a second vehicle 114B (e.g., Vehicle 235), and a third vehicle 114C (e.g., Vehicle 164) have arrived at the same location. Important to note, for illustrative purposes, the vehicle assigned to the user 102 (e.g., Vehicle 854) has not yet arrived.

In some examples, the vehicles 114 can be part of a fleet of vehicles managed by the service provider. In at least one example, the vehicles 114 can be autonomous vehicles. An autonomous vehicle can be configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since an autonomous vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicles 114 are autonomous vehicles; however, the vehicles 114 could be any other type of vehicle.

In at least one example, the vehicles 114 can be associated with a "specific mode," or a mode that prohibits the vehicles 114 from being claimed by any user other than the user assigned to each vehicle. That is, in the specific mode, each vehicle is assigned a trip (and thus, a user), and each user is assigned to a vehicle. A vehicle that is associated with a specific mode cannot transport any user other than the user assigned to the vehicle and the user cannot be transported by any vehicle other than the vehicle assigned to the user. In another example, one or more of the vehicles 114 can be associated with a "nonspecific mode," or a mode that enables the one or more of the vehicles 114 to be claimed by users (e.g., other than the assigned users), for example, on a first-come, first-served basis, or by sharing a ride (e.g., if both users claim a vehicle at the same time). In some examples, the service provider can send a signal to cause individual vehicles in the fleet of vehicles to transition from the specific mode to the nonspecific mode. In some examples, a vehicle can transition from the specific mode to the nonspecific mode without a signal from the service provider.

In at least one example, one or more of the vehicles 114 can include one or more emitters 116A-E (collectively, emitter(s) 116). For example, the emitter(s) 116, which can include speakers, lights, signs, display screens, touch screens, haptic emitters (e.g., vibration and/or force feedback), mechanical actuators (e.g., seatbelt tensioners, seat positioners, headrest positioners, etc.), and the like, can present information to the user 102. In at least one example, the emitters 116 can indicate whether a corresponding vehicle is occupied. In some examples, the emitters 116 can indicate information associated with another user in the corresponding vehicle (e.g., compatibility information). Moreover, in at least one example, the emitters 116 can output trip information associated with an occupant of a corresponding vehicle and/or the user 102. For instance, as illustrated in FIG. 1B, the emitter 116A is outputting an estimated time of arrival (ETA) of 5:45 pm. In such an example, the ETA can be determined based at least in part on a trip associated with the occupant of the first vehicle 114A. That is, if the user 102 claims the first vehicle 114A, the user's ETA is likely to change from 5:25 pm to 5:45 pm. Such information can be presented to assist the user 102 in determining which vehicle of the vehicles 114 to claim.

Figure 1C:
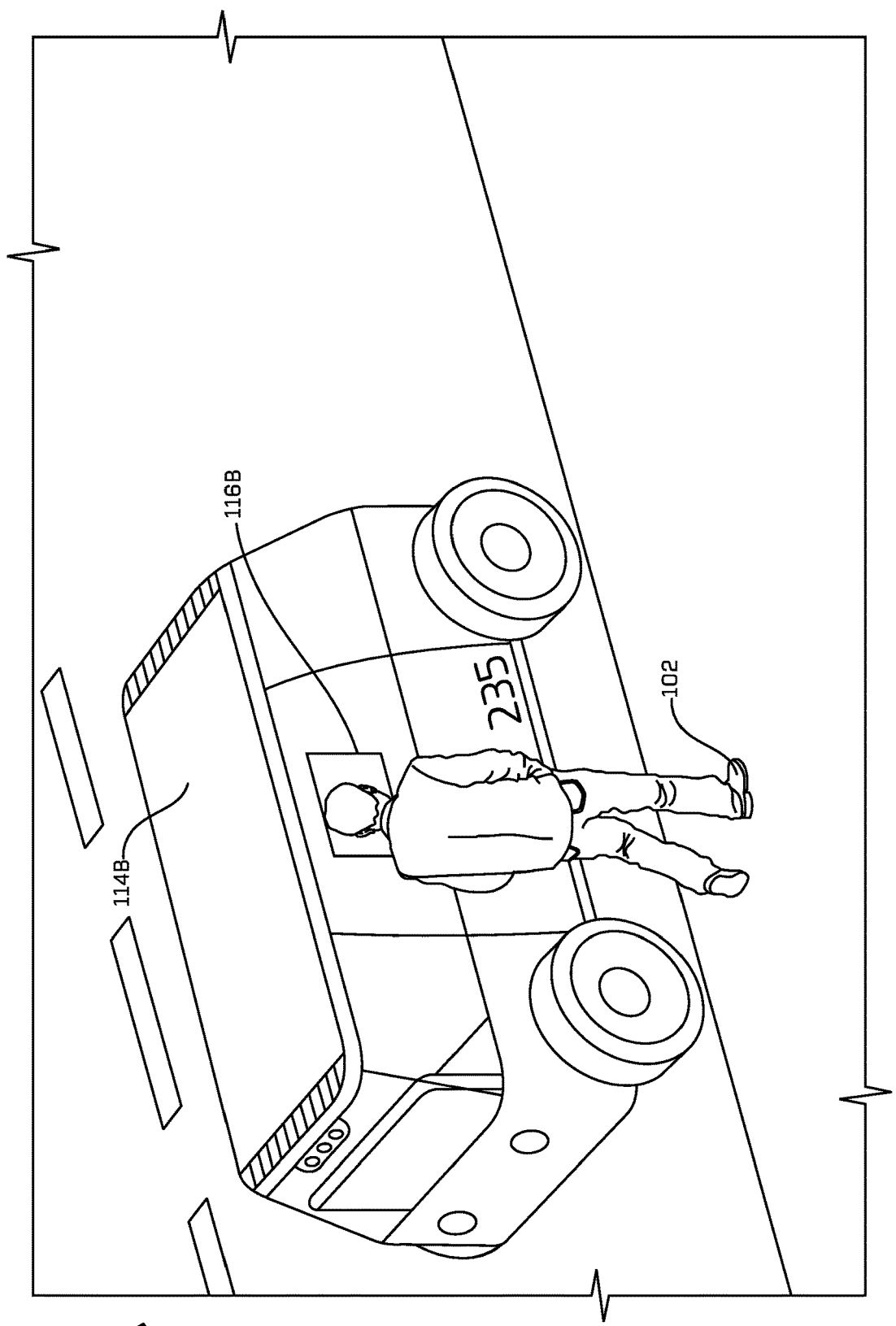
FIG. 1C illustrates the example environment from FIG. 1A, wherein the user is approaching a vehicle associated with a nonspecific mode (e.g., instead of a vehicle originally assigned to the user), as described herein.

FIG. 1C illustrates the example environment 100 from FIG. 1A, wherein the user 102 is approaching a vehicle (e.g., the second vehicle 114B) associated with a nonspecific mode (e.g., instead of a vehicle originally assigned to the user 102), as described herein. In at least one example, when a vehicle is associated with a nonspecific mode, any user can claim the vehicle. For the purpose of this discussion, "claiming" a vehicle can refer to associating a trip of a user with the vehicle, thereby enabling the user to utilize and/or otherwise access the vehicle. In at least one example, the service provider can assign a trip to the second vehicle 114B responsive to receiving an indication that the user 102 intends to claim the second vehicle 114B. In some examples, the service provider can receive an identifier associated with the second vehicle 114B, indicating that the user 102 intends to claim the second vehicle 114B from a user device 104 of the user 102. In some examples, the second vehicle 114B can receive an identifier associated with the user 102, the user device 104, and/or the trip, indicating that the user 102 intends to claim the second vehicle 114B, through various mechanisms, as described below.

In at least one example, the user 102 can be proximate to the second vehicle 114B for the second vehicle 114B to receive an identifier associated with the user 102 and/or the trip. For purposes of this discussion, a user can be "proximate" a vehicle if the user is within a threshold distance of the vehicle. In some examples, the threshold distance can correspond to a range of a network. That is, when a user is close enough to the vehicle that the vehicle can access an identifier associated with the user, the user device of the user, and/or the trip via a network, the user can be proximate the vehicle. In some examples, a user can be proximate a vehicle such that the user can view features of the vehicle (e.g., in order to read and input an identifier associated with the vehicle into their application on their user device). In yet another example, a user can be "proximate" a vehicle if the user is in a same location of the vehicle, as described above.

In at least one example, the second vehicle 114B can receive an identifier associated with the user 102, the user device 104, and/or the trip from an application associated with the user device 104, for instance, via a network (e.g., WI-FI®, BLUETOOTH®, NFC, etc.). As described above, in at least one example, a user device 104 of a user 102 can be associated with an application that enables the user 102 to request transportation services from the service provider. In at least one example, the application can store and/or have access to data associated with a profile of the user 102. Furthermore, in some examples, the service provider can send information associated with a trip (e.g., trip information) to the user device 104 of the user 102. For instance, the service provider can send an estimated time of pick-up, an estimated time of arrival at the intended destination (e.g., drop-off location), identification information associated with the vehicle (e.g., Vehicle 854), and/or a trip identifier associated with a trip of a user 102 to the user device 104 of the user 102. The application can store the information, at least temporarily, and at least some of the information can be presented to the user 102 (e.g., via a GUI of the user device 104).

In at least one example, the application can provide an identifier of the user 102, the user device 104, and/or the trip via a network (e.g., WI-FI®, BLUETOOTH®, NFC, etc.) to the second vehicle 114B. That is, based at least in part on the user 102 being proximate to the second vehicle 114B, the second vehicle 114B can receive the identifier (e.g., via the network), send the identifier to the service provider, and can receive trip information corresponding to the trip from the service provider. In such an example, the service provider can indirectly receive the identifier from the application (e.g., via the second vehicle 114B). As described above, such trip information can include the pick-up location, the intended destination (e.g., drop-off location), identification information associated with the user (e.g., a user identifier), a trip identifier, combinations of the foregoing, and the like. In some examples, the user 102 can authenticate the connection to the network to enable the second vehicle 114B to receive the identifier associated with the user 102, the user device 104, and/or the trip (e.g., via the application).

In some examples, the second vehicle 114B can receive an identifier associated with the user 102, the user device 104, and/or the trip by reading, or otherwise capturing, the identifier or a code representing the identifier (e.g., a barcode, a QR code) from the user device 104 of the user 102. In such examples, the second vehicle 114B can be associated with a reader device, an image capturing device, and/or another sensor to enable the second vehicle 114B to capture the code and/or the image data and provide the code and/or the image data to the service provider.

In some examples, the user 102 can interact with a display, an audio system (e.g., microphone and/or speaker), and/or another interface associated with the second vehicle 114B to provide the identifier to the second vehicle 114B. In such examples, the second vehicle 114B can send an indication of the identifier, which can be audio data (associated with the identifier), to the service provider, and the service provider can send trip information corresponding to the trip to the second vehicle 114B.

Furthermore, in some examples, the second vehicle 114B can utilize face detection and/or other biometric detection to identify a user and thus receive an identifier associated with the user 102. In such examples, the second vehicle 114B can use one or more sensor system(s) associated with the second vehicle 114B and/or machine-trained algorithms (e.g., face detection, etc.) to detect faces of users and/or for other biometric identification.

In another example (e.g., not illustrated in FIGS. 1A-1C), a user may not have requested a ride. In such an example, a trip has not yet been associated with the user and/or there is no trip identifier available for the user. Nevertheless, if the second vehicle 114B is associated with a nonspecific mode, the user can still hail a ride from the second vehicle 114B. In such an example, the user can interact with a display, an audio system (e.g., microphone and/or speaker), and/or another interface associated with the second vehicle 114B to provide an intended destination (e.g., drop-off location) and the second vehicle 114B can send the intended destination (e.g., drop-off location) to the service provider. The service provider can generate a trip associated with transporting the user from a current location to an intended destination (e.g., drop-off location) and can send trip information corresponding to the trip to the second vehicle 114B. In at least one example, the user can receive confirmation that they have claimed the second vehicle 114B, for example, via the application on the user device 104, from an emitter internal to the second vehicle 114B, and/or via another means of presenting information.

Furthermore, in at least one example, the user 102 can provide an identifier of the second vehicle 114B (e.g., Vehicle 235) to the application (e.g., via an interface associated therewith) (or the application can capture the identifier of the second vehicle 114B using a camera or other sensors) and the application can send such an identifier to the service provider. That is, as the user 102 is approaching the second vehicle 114B, the user 102 can input the identifier of the second vehicle 114B (e.g., Vehicle 235) via the GUI 106 or via another input mechanism. The application can send the identifier of the second vehicle 114B to the service provider and the service provider can assign the trip to the second vehicle 114B. As such, the service provider can send trip information corresponding to the trip to the second vehicle 114B.

In at least one example, responsive to the user 102 claiming the second vehicle 114B, the service provider can associate an identifier associated with the second vehicle 114B with a profile of the user 102 maintained by the service provider. That is, the service provider can reassign the second vehicle 114B to the user 102 and/or otherwise associate the second vehicle 114B with the user 102.

In at least some examples, additional information may be conveyed to the user 102 (e.g., via the user device, as presented outside the second vehicle 114B in response to proximity detection, etc.) prior to the user entering the second vehicle 114B. For instance, in those examples in which one or more users are already in the second vehicle 114B and/or in which multiple users simultaneously approach the second vehicle 114B, routing may prioritize users who are already en route (or to whom the second vehicle 114B is already assigned). In such examples, the second vehicle 114B may convey information regarding the estimated time of arrival (ETA) for the user 102 should the user 102 choose to claim the second vehicle 114B, a compatibility signal associated with the multiple users, and the like.

FIG. 1D illustrates the example environment 100 from FIG. 1A, wherein the user 102 is being transported by the vehicle (e.g., the second vehicle 114B) associated with the nonspecific mode (e.g., instead of a vehicle originally assigned to the user), as described herein. Based at least in part on receiving trip information corresponding to the trip, the second vehicle 114B can transport the user 102 to the intended destination (e.g., drop-off location) of the user 102. That is, computing system(s) associated with the second vehicle 114B can control the second vehicle 114B based at least in part on the trip information to transport the user 102 to the intended destination (e.g., drop-off location) of the user 102. As a result, the first vehicle to which the trip associated with the user 102 was originally assigned can be assigned a different trip associated with a different user 102.

In at least one example, after the user 102 gets in the second vehicle 114B, emitter(s) (e.g., the emitters 116) and/or other interface(s) associated with the second vehicle 114B can output information associated with the trip of the user 102. For example, the emitter(s), which can include speakers, lights, signs, display screens, touch screens, haptic emitters (e.g., vibration and/or force feedback), mechanical actuators (e.g., seatbelt tensioners, seat positioners, headrest positioners, etc.), and the like, can provide an indication of the intended destination (e.g., drop-off location), an estimated time of arrival, and the like. While the emitters 116 are illustrated as external to the vehicles 114, in some examples, the emitters can be in the interior of the vehicles 114.

Figure 1E:
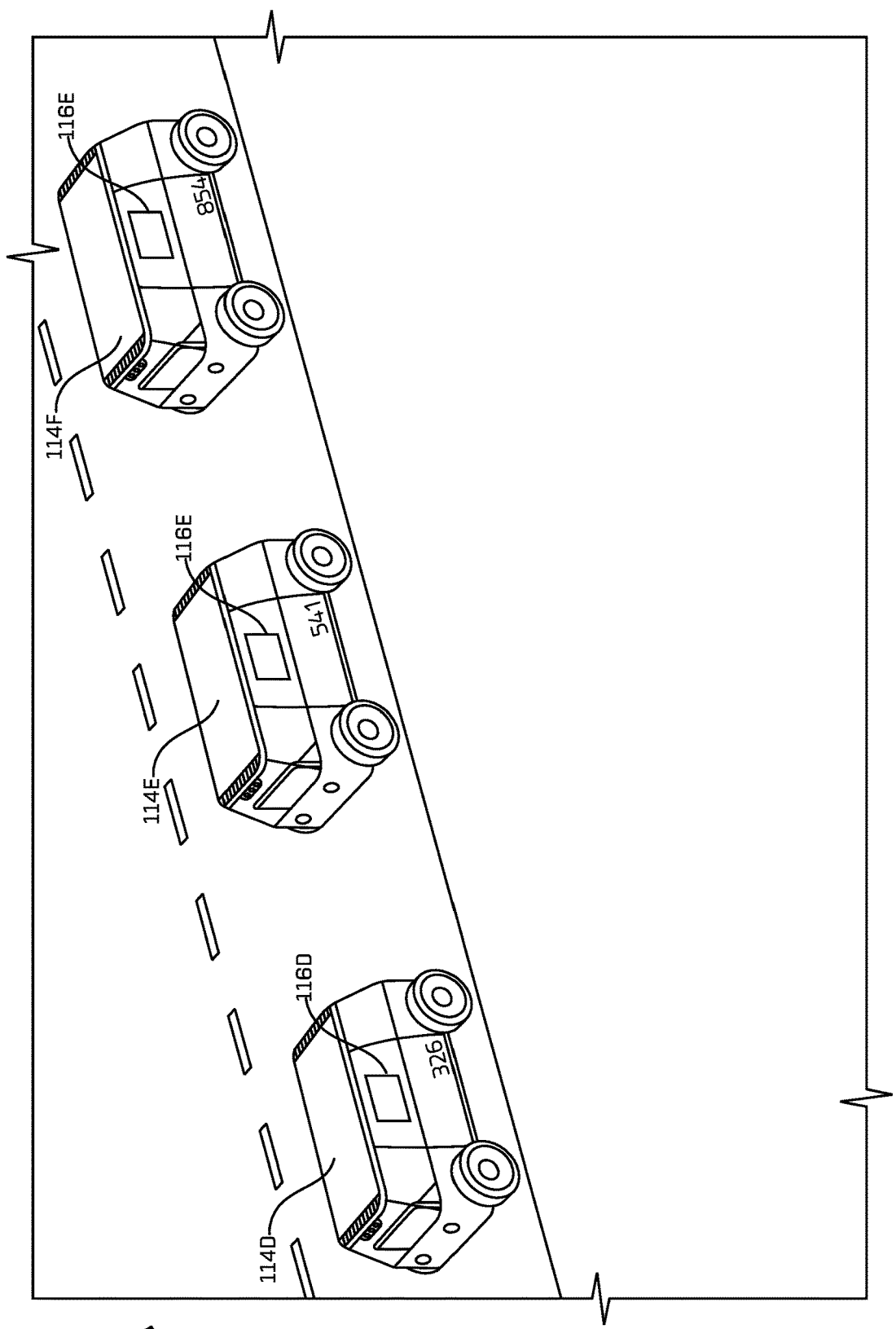
FIG. 1E illustrates the example environment from FIG. 1A, wherein the vehicle originally assigned to the user arrives (e.g., after the user has entered the vehicle associated with the nonspecific mode), as described herein.

FIG. 1E illustrates the example environment 100 from FIG. 1A, wherein the vehicle originally assigned to the user 102 (e.g., Vehicle 854) arrives (e.g., after the user has entered the vehicle associated with the nonspecific mode), as described herein. FIG. 1E illustrates additional vehicles 114 of the fleet of vehicles that have arrived at the pick-up location (e.g., a fourth vehicle 114D (e.g., Vehicle 326), a fifth vehicle 114E (e.g., Vehicle 541), and a sixth vehicle 114F (e.g., Vehicle 854)). In at least one example, the vehicle originally assigned to the user 102, the sixth vehicle 114F (e.g., Vehicle 854), can arrive at the pick-up location sometime after the user 102 has departed from the pick-up location in the second vehicle 114B. In some examples, the service provider can assign a new trip to the sixth vehicle 114F (e.g., associated with another user in the same location). For example, the service provider can perform one or more optimizations to leverage the newly freed sixth vehicle 114F, for example by reprogramming the sixth vehicle 114F based on a new user and with respect to the fleet of vehicles as a whole. In other examples, the service provider can disassociate the trip associated with the user 102 from the sixth vehicle 114F and may not reassign another trip to the sixth vehicle 114F immediately thereafter. In such an example, the sixth vehicle 114F can wait for the service provider to assign another trip to the sixth vehicle 114F, or for another user to utilize the sixth vehicle 114F, at which time the sixth vehicle 114F can receive trip information associated with the other user. Additional details are provided below.

Figure 2:
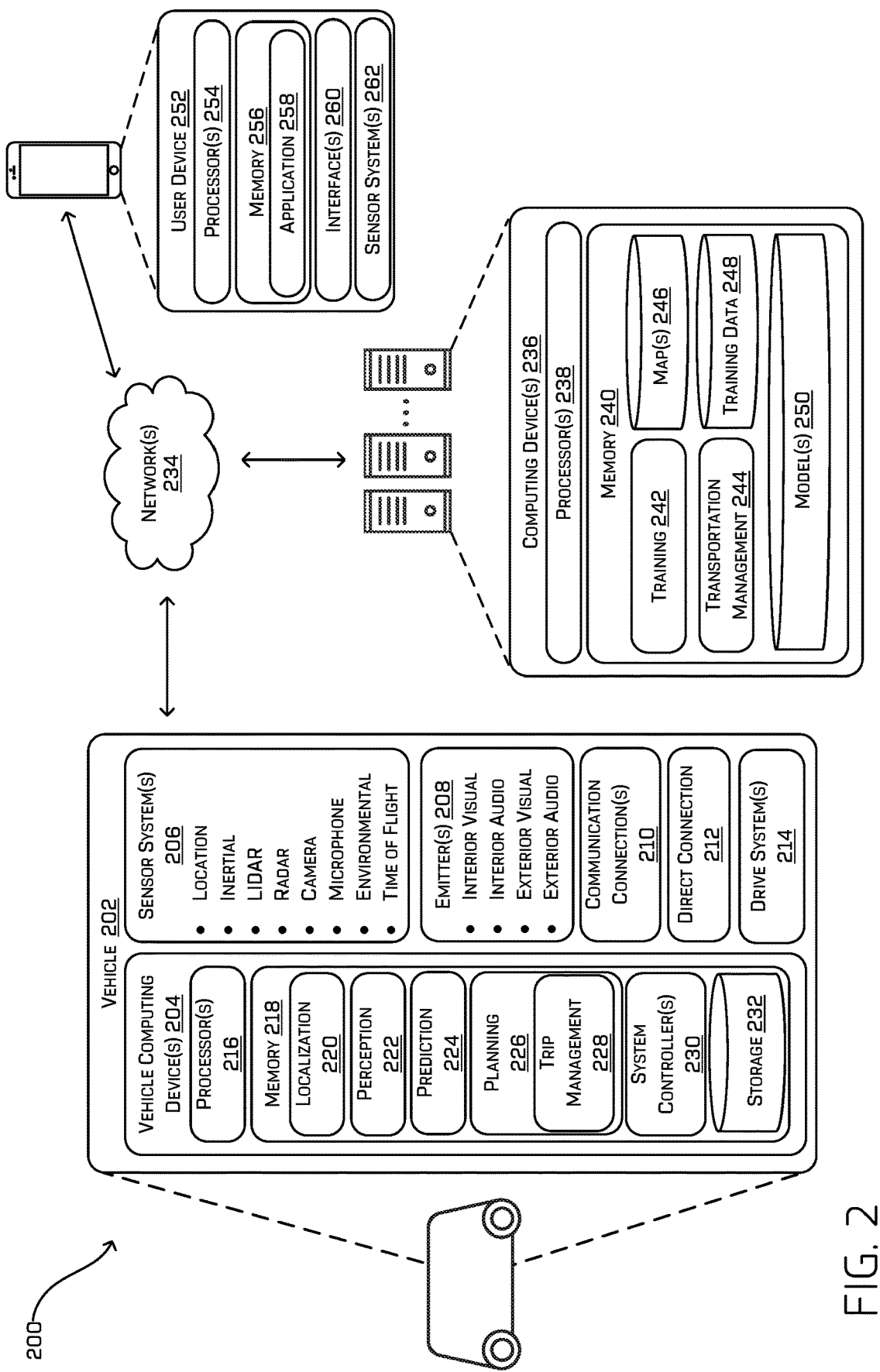
FIG. 2 is a block diagram illustrating an example system for performing techniques, as described herein.

FIG. 2 is a block diagram illustrating an example system 200 for performing techniques, as described herein. In at least one example, a vehicle 202 (which can correspond to any of the vehicles 114 described above with reference to FIGS. 1A-1E) can include one or more vehicle computing devices 204, one or more sensor systems 206, one or more emitters 208, one or more communication connections 210, at least one direct connection 212, and one or more drive systems 214. As described above, the vehicle 202 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 202 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 202 is an autonomous vehicle; however, the vehicle 202 could be any other type of vehicle. While only a single vehicle 202 is illustrated in FIG. 2, in a practical application, the example system 200 can include a plurality of vehicles, which, in some examples, can comprise a fleet of vehicles.

The vehicle computing device(s) 204 can include processor(s) 216 and memory 218 communicatively coupled with the processor(s) 216. In the illustrated example, the memory 218 of the vehicle computing device(s) 204 stores a localization system 220, a perception system 222, a prediction system 224, a planning system 226, and one or more system controllers 230. Additionally, the memory 218 can include a storage 232, which can store map(s), model(s), trip information, etc. As described above, a map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments. Model(s) can include machine-trained models, as described below. Trip information is described above.

In at least one example, the localization system 220 can determine a pose (position and orientation) of the vehicle 202 in relation to a local and/or global map based at least in part on sensor data received from the sensor system(s) 206 and/or map data associated with a map (e.g., of the map(s)). In at least one example, the localization system 220 can include, or be associated with a calibration system that is capable of performing operations for calibrating (determining various intrinsic and extrinsic parameters associated with any one or more of the sensor system(s) 206), localizing, and mapping substantially simultaneously. Additional details associated with such a system are described in U.S. patent application Ser. No. 15/675,487, filed on Aug. 11, 2017, also known as U.S. Patent Publication No. 2019/0049242, which is related to U.S. patent application Ser. No. 15/674,853, filed on Aug. 11, 2017, also known as U.S. Patent Publication No. 2019/0049566, the entire contents of both of which are incorporated by reference herein.

In at least one example, the perception system 222 can perform object detection, segmentation, and/or classification based at least in part on sensor data received from the sensor system(s) 206. In at least one example, the perception system 222 can receive raw sensor data (e.g., from the sensor system(s) 206). In at least one example, the perception system 222 can receive image data and can utilize one or more image processing algorithms to perform object detection, segmentation, and/or classification with respect to object(s) identified in the image data. In some examples, the perception system 222 can associate a bounding box (or otherwise an instance segmentation) with an identified object and can associate a confidence score associated with a classification of the identified object with the identified object. In some examples, objects, when rendered via a display, can be colored based on their perceived class. The perception system 222 can perform similar processes for one or more other modalities.

The prediction system 224 can receive sensor data from the sensor system(s) 206, map data associated with a map (e.g., of the map(s) which can be in storage 232), and/or perception data output from the perception system 222 (e.g., processed sensor data), and can output predictions associated with one or more objects within the environment of the vehicle 202. In at least one example, the planning system 226 can determine routes and/or trajectories to use to control the vehicle 202 based at least in part on sensor data received from the sensor system(s) 206 and/or any determinations made by the perception system 222 and/or prediction system 224.

In at least one example, the planning system 226 can be associated with a trip management system 228 that can exchange data with the computing device(s) 236. In at least one example, the trip management system 228 can receive trip information corresponding to a trip associated with a user. Such trip information can include a pick-up location, an intended destination (e.g., drop-off location), identification information associated with the user (e.g., a user identifier), a trip identifier, combinations of the foregoing, and the like. In at least one example, the planning system 226 can utilize the trip information corresponding to the trip to determine routes and/or trajectories to use to control the vehicle 202 based at least in part on sensor data received from the sensor system(s) 206 and/or any determinations made by the perception system 222 and/or prediction system 224.

As described above, in at least one example, the vehicle 202 can be claimed by another user (e.g., different than the originally assigned user). In some examples, the trip management system 228 can receive an identifier as described above (e.g., via transmission over a network, receiving image data or a code representing the identifier, receiving an indication of a touch input via a display of the vehicle 202, receiving audio data representing a spoken input of the identifier, etc.) and can send the identifier (or an indication thereof) to the computing device(s) 236. In at least one example, the trip management system 228 can receive trip information corresponding to the trip associated with the identifier from the computing device(s) 236. Additional details are described below.

Additional details of localization systems, perception systems, prediction systems, and/or planning systems that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples (e.g., where the vehicle 202 is not an autonomous vehicle), one or more of the aforementioned systems can be omitted from the vehicle 202. While the systems described above are illustrated as "onboard" the vehicle 202, in other implementations, the systems can be remotely located and/or accessible to the vehicle 202. Furthermore, while the systems are described above as "systems," such systems can comprise one or more components for performing operations attributed to each of the systems.

In at least one example, the localization system 220, the perception system 222, the prediction system 224, and/or the planning system 226 can process sensor data, as described above, and can send their respective outputs over network(s) 234, to computing device(s) 236. In at least one example, the localization system 220, the perception system 222, the prediction system 224, and/or the planning system 226 can send their respective outputs to the computing device(s) 236 at a particular frequency, after a lapse of a predetermined period of time, in near real-time, etc.

In at least one example, the vehicle computing device(s) 204 can include one or more system controllers 230, which can be configured to control steering, propulsion, braking, safety, emitters, communication, and other systems of the vehicle 202. These system controller(s) 230 can communicate with and/or control corresponding systems of the drive system(s) 214 and/or other systems of the vehicle 202.

In at least one example, the sensor system(s) 206 can include light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., red, green blue (RGB), infrared (IR), intensity, depth, etc.), wheel encoders, microphones, environment sensors (e.g., temperature sensors, humidity sensors, light sensors, pressure sensors, etc.), Time of Flight (ToF) sensors, etc. The sensor system(s) 206 can include multiple instances of each of these or other types of sensors. For instance, the LIDAR sensors can include individual LIDAR sensors located at the corners, front, back, sides, and/or top of the vehicle 202. As another example, the camera sensors can include multiple cameras positioned at various locations about the exterior and/or interior of the vehicle 202. The sensor system(s) 206 can provide input to the vehicle computing device(s) 204. In some examples, the sensor system(s) 206 can preprocess at least some of the sensor data prior to sending the sensor data to the vehicle computing device(s) 204. In at least one example, the sensor system(s) 206 can send sensor data, via the network(s) 234, to the computing device(s) 236 at a particular frequency, after a lapse of a predetermined period of time, in near real-time, etc.

The vehicle 202 can also include one or more emitters 208 for emitting light and/or sound, as described above. The emitter(s) 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 208 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 208 can be positioned at various locations about the exterior and/or interior of the vehicle 202.

The vehicle 202 can also include communication connection(s) 210 that enable communication between the vehicle 202 and other local or remote computing device(s). For instance, the communication connection(s) 210 can facilitate communication with other local computing device(s) on the vehicle 202 and/or the drive system(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device(s) 204 to another computing device or a network, such as network(s) 234. For example, the communications connection(s) 210 can enable Wi-Fi-based communication such as via frequencies defined by the IEEE 802.11 standards, short range wireless frequencies such as BLUETOOTH, or any suitable wired or wireless communications protocol that enables the respective computing device to interface with the other computing device(s).

The direct connection 212 can directly connect the drive system(s) 214 and other systems of the vehicle 202.

In at least one example, the vehicle 202 can include drive system(s) 214. In some examples, the vehicle 202 can have a single drive system 214. In at least one example, if the vehicle 202 has multiple drive systems 214, individual drive systems 214 can be positioned on opposite ends of the vehicle 202 (e.g., the front and the rear, etc.). In at least one example, the drive system(s) 214 can include sensor system(s) to detect conditions of the drive system(s) 214 and/or the surroundings of the vehicle 202. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, LIDAR sensors, RADAR sensors, etc. Some sensors, such as the wheel encoder(s), can be unique to the drive system(s) 214. In some cases, the sensor system(s) on the drive system(s) 214 can overlap or supplement corresponding systems of the vehicle 202 (e.g., sensor system(s) 206).

The drive system(s) 214 can include many of the vehicle systems, including a high voltage battery, a motor to propel the vehicle 202, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive system(s) 214. Furthermore, the drive system(s) 214 also include communication connection(s) that enable communication by the respective drive module with other local or remote computing device(s).

In FIG. 2, the vehicle computing device(s) 204, sensor system(s) 206, emitter(s) 208, and the communication connection(s) 210 are shown onboard the vehicle 202. However, in some examples, the vehicle computing device(s) 204, sensor system(s) 206, emitter(s) 208, and the communication connection(s) 210 can be implemented outside of an actual vehicle (i.e., not onboard the vehicle 202).

As described above, the vehicle 202 can send sensor data to the computing device(s) 236, via the network(s) 234. In some examples, the vehicle 202 can send raw sensor data to the computing device(s) 236. In other examples, the vehicle 202 can send processed sensor data and/or representations of sensor data to the computing device(s) 236 (e.g., data output from the localization system 220, the perception system 222, the prediction system 224, and/or the planning system 226). In some examples, the vehicle 202 can send sensor data to the computing device(s) 236 at a particular frequency, after a lapse of a predetermined period of time, in near real-time, etc.

The computing device(s) 236 can receive the sensor data (raw or processed) from the vehicle 202 and/or other data collection devices (which can include other vehicles like 202), as well as data from one or more third party sources and/or systems. In at least one example, the computing device(s) 236 can include processor(s) 238 and memory 240 communicatively coupled with the processor(s) 238. In the illustrated example, the memory 240 of the computing device(s) 236 stores a training system 242, a transportation management system 244, a map(s) storage 246 (e.g., storing one or more maps), a training data storage 248 (e.g., storing training data accessible to the training system 242), and a model(s) storage 250 (e.g., models output by the training system 242). In some examples, one or more of the systems and/or storage repositories can be associated with the vehicle 202 instead of, or in addition to, being associated with the memory 240 of the computing device(s) 236.

In at least one example, the training system 242 can train data model(s), which can be used for various operations as described herein. For example, machine learning algorithms for training machine learned model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 7 (ID7), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc. The resulting data model(s) can be stored in the model(s) storage 250 and/or the storage 232 on the vehicle 202 and can be accessed by the perception system 222 for detecting and/or classifying objects.

The transportation management system 244 can receive requests for transporting users between locations. In at least one example, the transportation management system 244 can receive a request to transport a user from a first location to a second location. The first location can correspond to a pick-up location and the second location can correspond to an intended destination (e.g., drop-off location) of the user. The transportation management system 244 can generate a trip to associate with the request of the user, for example, to transport the user from the first location to the second location. In at least one example, the transportation management system 244 can associate trip information, which can include the pick-up location, the intended destination (e.g., drop-off location), identification information associated with the user (e.g., a user identifier), a trip identifier, etc., with the trip. As described above, trip information can otherwise include an estimated time of pick-up, an estimated time of arrival at the intended destination (e.g., drop-off location), identification information associated with the vehicle assigned to the trip, etc.

In at least one example, the transportation management system 244 can associate a vehicle, such as the vehicle 202, in a fleet of vehicles with the trip and/or trip identifier. That is, the transportation management system 244 can assign a vehicle, such as the vehicle 202, to the trip and/or the trip identifier. In at least one example, the transportation management system 244 can send trip information associated with the trip, or portions thereof, to the vehicle 202 and/or a user device of the user.

The transportation management system 244 can receive an indication that a user desires to travel via the vehicle 202 even though the vehicle 202 is not assigned to the user. For instance, the trip management system 228 can receive an identifier associated with the user, the user device of the user, and/or the trip and can provide the identifier to the transportation management system 244. In such an example, the transportation management system 244 can access trip information associated with the identifier and can send trip information corresponding to the trip to the vehicle 202. The trip management system 228 can receive the trip information and can provide the trip information to the planning system 226 for use as described above.

In other examples, the transportation management system 244 can receive an identifier associated with a particular vehicle, such as the vehicle 202, from a user device of the user who desires to travel via the vehicle 202. In such an example, the transportation management system 244 can access trip information associated with the user (e.g., which can be determined based on a user identifier associated with the identifier of the particular vehicle) and can send trip information corresponding to the trip to the vehicle 202. The trip management system 228 can receive the trip information and can provide the trip information to the planning system 226 for use as described above.

In some examples, the transportation management system 244 can assign and reassign trips as vehicles are claimed by different users. Additional details are provided below.

Furthermore, in at least one example, the transportation management system 244 can utilize historical data associated with transportation requests, current transportation requests, calendar data, etc. to determine a demand associated with a particular location serviced by the fleet of vehicles. In some examples, the determined demand can be used to determine when to dispatch a fleet of vehicles, or a portion thereof, to a particular location. In such an example, the particular location can correspond to a concert, a festival, a sporting event, a transportation hub (e.g., train station, bus station, airport, etc.), etc. In some examples, the transportation management system 244 can cause at least a portion of the fleet of vehicles to transition from a specific mode to a nonspecific mode as described above. In such examples, the transportation management system 244 can send a signal to individual vehicles in the fleet of vehicles to cause the individual vehicles to transition from the specific mode to the nonspecific mode. Additional details are provided below. In at least some examples, when in a nonspecific mode and occupied, routing directives may be received from the transportation management system 244 which optimize the vehicle 202 for minimizing total ride time (energy usage, distance travelled, etc.). In some examples, once the vehicle 202 has been utilized by a non-designated rider (e.g., a rider who "claims" the vehicle), such a transportation management system 244 may optimize the remaining fleet (including any vehicles originally committed to waiting passengers subsequently freed after such passengers "claim" other vehicles of the fleet), for example, to minimize a total waiting time for additional passengers, distance traveled, energy used, or the like.

The example system 200 can additionally include at least one user device 252. The user device 252 can be a mobile computing device, including but not limited to a phone, a tablet, a laptop, a wearable, or any other computing device operable by a user. While a single user device is illustrated in FIG. 2, in practical applications of techniques described herein, the example system 200 can include tens or hundreds, if not thousands, of user devices.

The user device 252 can include processor(s) 254, memory 256, and an application 258. The application 258 can be a functional component that enables a user to interact with the user device 252, for example to request transportation services available via the service provider. As described above with reference to FIG. 1A, a user can interact with the user device 252, for example to set a pickup location for a trip, set a destination location for the trip (e.g., a drop-off location), set details associated with the trip, control one or more features associated with a vehicle, navigate the vehicle from the pickup location to the destination location, pay for the trip, and/or the like. To assist the user, the application 258 provides the user with a user interface, which can be presented via one of the interface(s) 260 (e.g., one or more displays (e.g., including input capabilities), gesture-based inputs, haptic feedback, etc.).

In at least one example, the user can input at least an intended destination via the user interface and the application 258 can send the intended destination (e.g., a drop-off location) to the computing device(s) 236. In some examples, the user can additionally provide a pick-up location or the application 258 can determine the pick-up location (e.g., using GPS or other location sensor(s)). As described above, in some examples, the user device 252 can utilize the sensor system(s) 262 (e.g., location sensor(s) (e.g., GPS sensor(s)), inertial (e.g., accelerometer(s), magnetometer(s), etc.), camera(s), microphone(s), and the like) to determine the location of the user device 252, which can correspond to the pick-up location. In at least one example, the application 258 can send the pick-up location to the computing device(s) 236. In some examples, the transportation management system 244 can send trip information to the application 258. For example, the transportation management system 244 can send an estimated time of pick-up, an estimated time of arrival at the intended destination, identification information associated with the vehicle, and/or the identifier associated with the trip associated with the user to the application 258. The application 258 can store the information, at least temporarily. Additional details are provided below.

The processor(s) 216 of the vehicle 202, the processor(s) 238 of the computing device(s) 236, and the processor(s) 254 of the user device 252 can be any suitable processor capable of executing instructions to process data and perform operations as described herein. By way of example and not limitation, the processor(s) 216, 238, and 254 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218, 240, and 256 are examples of non-transitory computer-readable media. Memory 218, 240, and 256 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 2 is illustrated as a distributed system, in some examples, systems of the vehicle 202 can be associated with the computing device(s) 236 and/or systems of the computing device(s) 236 can be associated with the vehicle 202. That is, the vehicle 202 can perform one or more of the functions associated with the computing device(s) 236, and vice versa.

FIGS. 3-8 are flowcharts showing example methods and/or processes involving techniques as described herein. The methods and/or processes illustrated in FIGS. 3-8 are described with reference to the system 200 shown in FIG. 2 for convenience and ease of understanding. However, the methods and/or processes illustrated in FIGS. 3-8 are not limited to being performed using the system 200. Moreover, the system 200 described herein is not limited to performing the methods and/or processes illustrated in FIGS. 3 8.

The methods and/or processes 300-800 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods and/or processes 300-800 can be combined in whole or in part with each other or with other methods.

Figure 3:
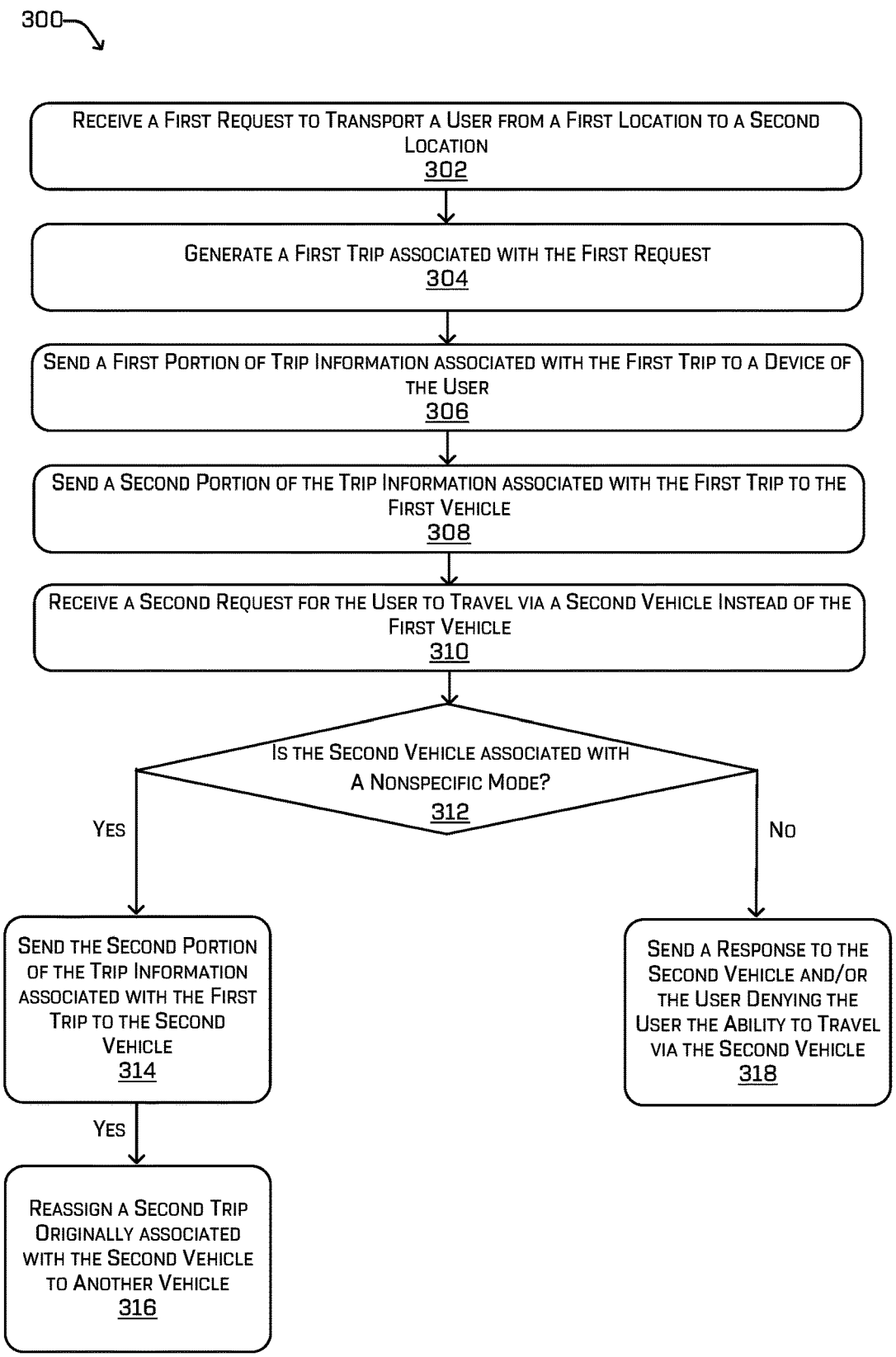
FIG. 3 illustrates an example process for enabling a user to be transported by a vehicle other than a vehicle to which the user was originally assigned, as described herein.

FIG. 3 illustrates an example process 300 for enabling a user to be transported by a vehicle other than a vehicle to which the user was originally assigned, as described herein.

Block 302 illustrates receiving a first request to transport a user from a first location to a second location. As described above with reference to FIG. 2, a user device 252 can have an instance of the application 258 stored thereon that enables a user to interact with the user device 252, for example to request transportation services available via the service provider. In at least one example, a user can interact with the user device 252, for example to set a pickup location for a trip, set a destination location for the trip (e.g., a drop-off location), set details associated with the trip, control one or more features associated with a vehicle, navigate the vehicle from the pickup location to the destination location, pay for the trip, and/or the like. To assist the user, the application 258 provides the user with a user interface, which can be presented via one of the interface(s) 260 (e.g., one or more displays (e.g., including input capabilities), gesture-based inputs, haptic feedback, etc.).

In at least one example, the user can input at least an intended destination (e.g., a drop-off location) via the user interface and the application 258 can send the intended destination (e.g., a drop-off location) to the computing device(s) 236. In some examples, the user can additionally provide a pick-up location or the application 258 can determine the pick-up location (e.g., using GPS or other location sensor(s)). As described above, in some examples, the user device 252 can utilize the sensor system(s) 262 (e.g., location sensor(s) (e.g., GPS sensor(s)), inertial (e.g., accelerometer(s), magnetometer(s), etc.), camera(s), microphone(s), and the like) to determine the location of the user device 252, which can correspond to the pick-up location. In at least one example, the application 258 can send the pick-up location to the computing device(s) 236. In at least one example, such input (e.g., the pick-up location and/or the intended destination (e.g., the drop-off location)) can be associated with a request to transport the user (e.g., via transportation services available via the service provider). The request can be received by the transportation management system 244.

Block 304 illustrates generating a first trip associated with the request. In at least one example, the application 258 can send the pick-up location and/or the intended destination (e.g., drop-off location) to the transportation management system 244, for example, in association with a request, and the transportation management system 244 can generate a trip for transporting the user 102 from the pick-up location (e.g., the first location) to the intended destination (e.g., the second location). In at least one example, the transportation management system 244 can assign the first trip to a first vehicle in a fleet of vehicles. That is, the transportation management system 244 can associate an identifier of a user, a device of the user, and/or a trip identifier with the first vehicle. In some examples, the transportation management system 244 can assign the first trip to the first vehicle based at least in part on a location of the first vehicle, a characteristic of the first vehicle (e.g., disability-friendly, car seat, pet-friendly, etc.), a preference of the user, etc. As a result, an identifier of the first vehicle can be associated with the user identifier and/or the trip identifier; thus, the user can be assigned to the first vehicle and vice versa. For the purpose of this discussion, the first vehicle is a vehicle different than the vehicle 202 but can be similarly configured as the vehicle 202.

In at least one example, the trip can be associated with trip information which can include a pick-up location, an intended destination (e.g., drop-off location), identification information associated with the user (e.g., a user identifier), a trip identifier, etc. As described above, trip information can otherwise include an estimated time of pick-up, an estimated time of arrival at the intended destination (e.g., drop-off location), identification information associated with the vehicle assigned to the trip, etc.

Block 306 illustrates sending a first portion of trip information associated with the first trip to a device of the user. In some examples, the transportation management system 244 can send trip information to the user device 104. For example, the transportation management system 244 can send an estimated time of pick-up, an estimated time of arrival at the intended destination (e.g., drop-off location), identification information associated with the vehicle, and/or the identifier associated with the trip associated with the user to the user device 252. In at least one example, the application 258 can store the information, at least temporarily, and at least some of the information can be presented to the user, via a GUI (e.g., GUI 106 as illustrated and described above with reference to FIG. 1A).

Block 308 illustrates sending a second portion of the trip information associated with the first trip to the first vehicle. In at least one example, the transportation management system 244 can send trip information associated with the first trip to the first vehicle. Such trip information can include the pick-up location, the intended destination (e.g., drop-off location), identification information associated with the user (e.g., a user identifier), a trip identifier, combinations of the foregoing, and the like. The first vehicle (e.g., computing system(s) associated therewith) can utilize the second portion of the trip information to travel to the first location.

Block 310 illustrates receiving a second request for the user to travel via a second vehicle instead of the first vehicle. In at least one example, a second vehicle, which in this example can be the vehicle 202, can be at the first location when the user arrives at the first location. That is, the user can be in a same location and/or proximate to the second vehicle. In at least one example, the transportation management system 244 can receive a second request for the user to travel via the second vehicle (e.g., the vehicle 202) instead of the first vehicle. As described above, in at least one example, when a vehicle is associated with a nonspecific mode, any user can claim the vehicle thereby indicating that the user desires to travel via the vehicle. As described above, "claiming" a vehicle can refer to associating a trip of a user with the vehicle, in this example, the second vehicle, which can correspond to the vehicle 202.

In some examples, the transportation management system 244 can receive, from a user device 252 of the user, an identifier associated with the second vehicle, such as the vehicle 202, which can indicate that the user intends to claim the second vehicle. That is, in some examples, the second request can be associated with an identifier of the vehicle 202, that can be input via the application 258 on the user device 252, as described above. In some examples, the vehicle 202 can receive an identifier associated with the user, the user device 252 of the user, and/or the trip, indicating that the user intends to claim the vehicle 202, through various mechanisms, as described below. In such examples, the vehicle 202 can provide the identifier to the transportation management system 244. In such examples, the second request can be associated with an identifier of the user, the user device 252 of the user, and/or the trip. In some examples, the user may not send an explicit request, but a request can be inferred by the receipt of an identifier (e.g., of the vehicle, of the user, and/or of the trip).

As described above, in at least one example, the trip management system 228 can receive an identifier associated with the user, the user device 252 of the user, and/or the trip from the application 258, for instance, via a network (e.g., WI-FI®, BLUETOOTH®, NFC, etc.). That is, based at least in part on the user being proximate to the vehicle 202, the trip management system 228 can receive the identifier and can send the identifier to the transportation management system 244. In such an example, the transportation management system 244 can indirectly receive the identifier from the application (e.g., via the trip management system 228). In some examples, the user can authenticate the connection to the network to enable the trip management system 228 to receive the identifier associated with the user, the user device 252 of the user, and/or the trip (e.g., via the application 258).

In some examples, the trip management system 228 can receive an identifier associated with the user, the user device 252 of the user, and/or the trip by reading, or otherwise capturing, the identifier or a code representing the identifier (e.g., a barcode, a QR code) from the user device 252 of the user. In such examples, the vehicle 202 can be associated with a reader device, an image capturing device, and/or another sensor to enable the trip management system 228 to capture the code and/or the image data and provide the code and/or the image data to the transportation management system 244. In some examples, the user can interact with a display, audio system (e.g., microphone and/or speaker), and/or other interface associated with the vehicle 202 to provide the identifier to the trip management system 228. In such examples, the trip management system 228 can send an indication of the identifier, which can include audio data, to the transportation management system 244.

Furthermore, in some examples, the trip management system 228 can utilize face detection and/or other biometric detection to identify a user and thus receive an identifier associated with the user. In such examples, the trip management system 228 can use the sensor system(s) 206 associated with the vehicle 202 and/or machine-trained algorithms (e.g., face detection, etc.) to detect faces of users and/or for other biometric identification.

In at least one example, the user can provide an identifier of the vehicle 202 to the application 258 (or the application 258 can capture the identifier of the vehicle 202 using a camera or other sensors) and the application 258 can send such an identifier to the transportation management system 244. That is, as the user is approaching the vehicle 202, the user can input the identifier of the vehicle 202 (e.g., 235) via the GUI 106 or via another input mechanism. The application 258 can send the identifier of the vehicle 202 to the transportation management system 244. In at least one example, the receipt of the identifier can be associated with, or otherwise indicate, a request for the user to travel via the vehicle 202, instead of the vehicle to which he or she was assigned (e.g., the first vehicle).

In at least one example, a request received from the vehicle 202 can be associated with an identifier of the vehicle 202 and an identifier of at least one of the user, the user device 252, and/or the trip. A request received from the application 258 can be associated with an identifier of the user and/or the user device 252 and an identifier of the vehicle 202. As such, when the transportation management system 544 receives the second request, the transportation management system 544 can compare the identifiers to determine whether the user and/or trip are assigned to the vehicle 202. In this illustrative example, neither the user nor the trip was assigned to the vehicle 202 (e.g., they are assigned to a different vehicle identifier).

Block 312 illustrates determining whether the second vehicle is associated with a nonspecific mode. As described above, in at least one example, the vehicle 202 can be associated with a "specific mode," or a mode that prohibits the vehicle 202 from being claimed by any user other than the user assigned to each vehicle. That is, in the specific mode, each vehicle is assigned a trip (and thus, a user), and each user is assigned to a vehicle. A vehicle that is associated with a specific mode cannot transport any user other than the user assigned to the vehicle and the user cannot be transported by any vehicle other than the vehicle assigned to the user. In some examples, a default mode of operation for a vehicle can be a specific mode. That is, under normal conditions, a vehicle cannot be claimed by a user other than the assigned user. In at least one example, vehicles associated with particular purposes or having particular characteristics can be associated with a specific mode. For instance, a vehicle specially configured for disabled users or children may be associated with a specific mode thereby prohibiting users not assigned to that vehicle from claiming the vehicle.

In another example, a vehicle can be associated with a "nonspecific mode," or a mode that enables the vehicle to be claimed by users other than the assigned user, for example, on a first-come, first-served basis, or by sharing a ride (e.g., if both users claim a vehicle at the same time). In at least one example, the transportation management system 244 can send a signal to cause a vehicle to transition from the specific mode to the nonspecific mode.

In at least one example, responsive to receiving a request for a user to claim the vehicle 202 when the user was not originally assigned to the vehicle 202, the transportation management system 544 can determine whether the vehicle 202 is associated with a nonspecific mode.

Block 314 illustrates sending the second portion of the second trip information associated with the first trip to the second vehicle. Based at least in part on determining that the vehicle 202 is associated with the nonspecific mode, the transportation management system 244 can send the second portion of the trip information associated with the first trip to the second vehicle. That is, the trip management system 228 can receive the second portion of the trip information associated with the first trip, which can include pick-up location, the intended destination (e.g., drop-off location), identification information associated with the user (e.g., a user identifier), a trip identifier, combinations of the foregoing, and the like.

As described above, in an example, a user may not have requested a ride and may claim the vehicle 202 without having requested a ride. In such an example, a trip has not yet been associated with the user and/or there is no trip identifier available for the user. Nevertheless, if the vehicle 202 is associated with a nonspecific mode, the user can still hail a ride from the vehicle 202. In such an example, the user can interact with a display, an audio system (e.g., microphone and/or speaker), and/or another interface associated with the vehicle 202 to provide an intended destination (e.g., drop-off location) and the vehicle 202 can send the intended destination (e.g., drop-off location) to the service provider. The trip management module 244 can generate a trip associated with transporting the user from a current location to an intended destination (e.g., drop-off location) and can send trip information corresponding to the trip to the vehicle 202. In such an example, process 300 can begin at block 310 (and the second request may be the first request received, because the user did not previously request a ride).

Block 316 illustrates reassigning a second trip originally associated with the second vehicle to another vehicle. Based at least in part on the user claiming the second vehicle, the transportation management system 244 can reassign a trip originally assigned to the second vehicle to another vehicle. In some examples, the transportation management system 244 can reassign the second trip to the first vehicle (originally assigned to the user) or another vehicle associated with the fleet of vehicles. In at least one example, the transportation management system 244 can refrain from reassigning the second trip until the user has claimed the vehicle 202. In at least one example, based at least in part on the second trip being assigned to a different vehicle in the fleet of vehicles, the transportation management system 244 can send updated trip information to the user device of the user associated with the second trip. Such updated trip information can include updated vehicle identifier, for example, and an updated pick-up time.

Block 318 illustrates sending a response to the second vehicle and/or the user denying the user the ability to travel via the second vehicle. Based at least in part on determining that the vehicle 202 is not associated with the nonspecific mode (e.g., the vehicle 202 is associated with a specific mode), the transportation management system 244 can send a response to the second vehicle (e.g., the vehicle 202) and/or the user (e.g., the user device 252) denying the user the ability to travel via the second vehicle. That is, if the vehicle 202 is not associated with the nonspecific mode, the vehicle 202 cannot be claimed by the user.

In some examples, the vehicle 202 can be occupied by another user. That is, the vehicle 202 may already be associated with a first user and/or first trip identifier and can stop to pick-up another user. This could be the case if the first user selected a shared transportation option, for example, that is provides a discount or other benefit to the first user. In some examples, if another user (e.g., an occupant) already occupies the vehicle 202, the trip management system 228 can cause information to be output via the emitter(s) 208 of the vehicle 202. For instance, in at least one example, the emitter(s) 208 can output an indication that the vehicle 202 is occupied by another user, an indication of a direction the vehicle 202 is travelling, an estimated time of arrival at an intended destination (e.g., of the occupant of the vehicle), etc. In at least some examples, such an estimated time of arrival may be based on prioritizing trips for those occupants already in the vehicle 202 (or scheduled to be picked up by the vehicle 202). In some examples, as described below with reference to FIGS. 4 and 5, the emitter(s) 208 can output indications based at least in part on information known about the user and the occupant of the vehicle 202. In some examples, such information can be presented to the user via the user device 252, as described below.

Figure 4:
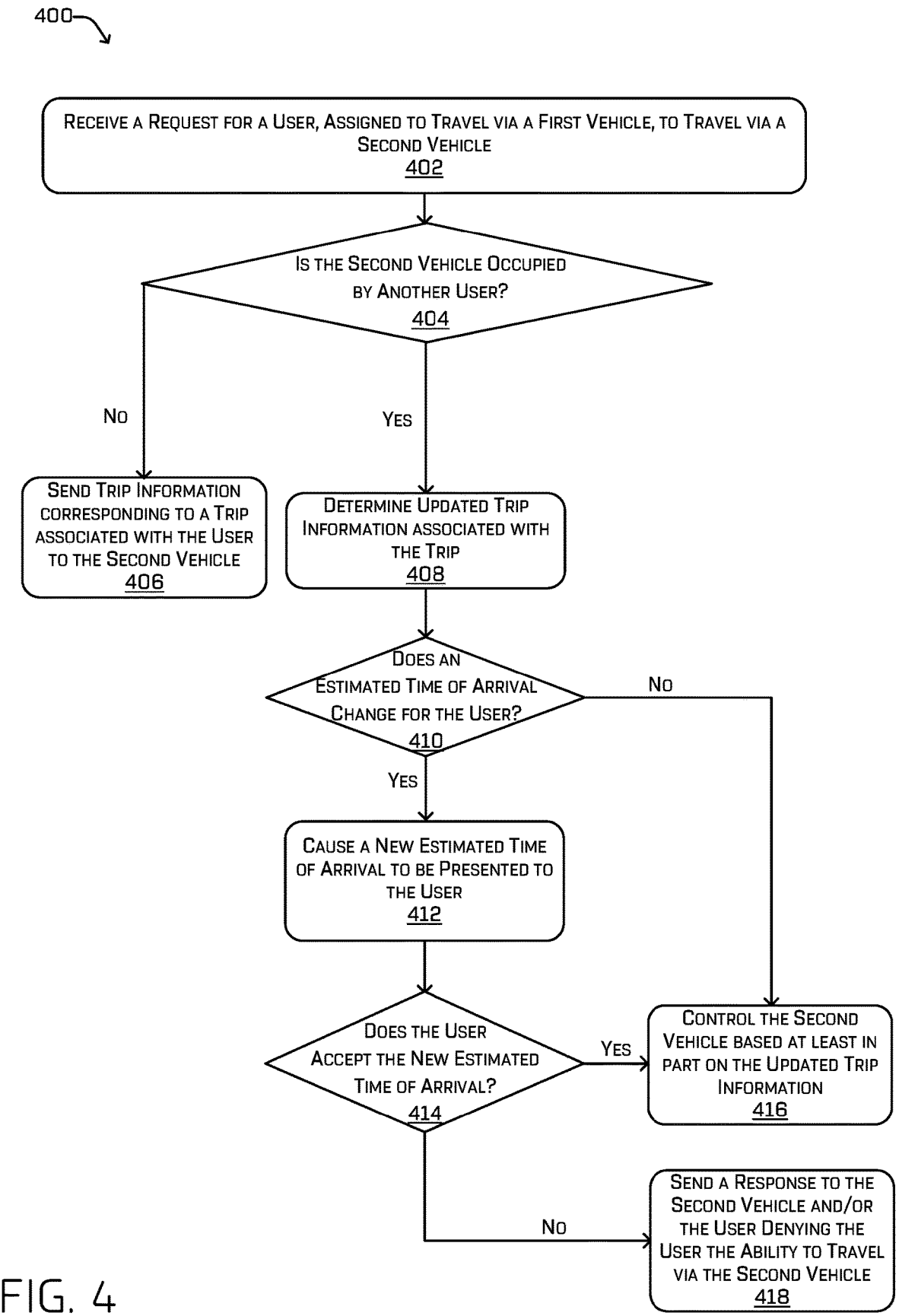
FIG. 4 illustrates an example process for presenting information to a user that is to be transported by a vehicle other than a vehicle to which the user was originally assigned when the other vehicle is already occupied by another user, as described herein.

FIG. 4 illustrates an example process 400 for presenting information to a user that is to be transported by a vehicle other than a vehicle to which the user was originally assigned when the other vehicle is already occupied by another user, as described herein.

Block 402 illustrates receiving a request for a user, assigned to travel via a first vehicle, to travel via a second vehicle. As described above with reference to block 310 of FIG. 3, the transportation management system 244 can receive a request from a user assigned to a first vehicle to travel via a second vehicle instead of the first vehicle. In at least one example, when a vehicle is associated with a nonspecific mode, any user can claim the vehicle thereby indicating that the user desires to travel via the vehicle. As described above, "claiming" a vehicle can refer to associating a trip of a user with the vehicle.

In some examples, the transportation management system 244 can receive, from a user device 252 of the user, an identifier associated with the second vehicle, such as the vehicle 202, which can indicate that the user intends to claim the second vehicle. That is, in some examples, the second request can be associated with an identifier of the vehicle 202, that can be input via the application 258 on the user device 252, as described above. In some examples, the vehicle 202 can receive an identifier associated with the user, the user device 252 of the user, and/or the trip, indicating that the user intends to claim the vehicle 202, through various mechanisms, as described above. In such examples, the vehicle 202 can provide the identifier to the transportation management system 244. In such examples, the second request can be associated with an identifier of the user, the user device of the user, and/or the trip. In some examples, the user may not send an explicit request, but a request can be inferred by the receipt of an identifier (e.g., of the vehicle, of the user, and/or of the trip).

Block 404 illustrates determining whether the second vehicle is occupied by another user. In at least one example, the vehicle 202 can be occupied by another user (or is already scheduled to service a request of another user). In some examples, the transportation management system 244 can determine that the vehicle 202 is occupied by another user based at least in part on knowing that the vehicle 202 is associated with another user and/or trip and where (e.g., location) along that trip the vehicle 202 is located. In some examples, the vehicle 202 can utilize the sensor system(s) 206 and/or emitter(s) 208 to determine whether another user is occupying the vehicle 202. In at least one example, the transportation management system 244 can determine whether the vehicle 202 is occupied by another user using one or more of the techniques described above.

When the vehicle 202 transitions to a nonspecific mode, the trip of the originally assigned user can take priority over the user who was not assigned to the vehicle 202, if the originally assigned user claims the vehicle 202 first.

Block 406 illustrates sending trip information corresponding to a trip associated with the user to the second vehicle. If the vehicle 202 is not occupied by another user, the transportation management system 244 can send trip information corresponding to the trip associated with the user to the vehicle 202 and the trip management system 228 can utilize the trip information to control the vehicle 202. In some such examples, if the second vehicle was scheduled to be deployed in response to a request from a second user, the transportation management system 244 may relay information to a third vehicle for fulfilling the request.

Block 408 illustrates determining updated trip information associated with the trip. In at least one example, if the vehicle 202 is occupied, the transportation management system 244 can access trip information associated with the occupant of the vehicle 202 and trip information associated with the user. In at least one example, the transportation management system 244 can determine updated trip information for the trip of the user, given the trip information associated with the occupant of the vehicle 202. For example, if the occupant of the vehicle 202 has an intended destination (e.g., drop-off location) that is 20 minutes away from the user, and not on the way to the user's intended destination (e.g., drop-off location), the transportation management system 244 can add 20 minutes to total travel time associated with the user's trip and/or update the estimated time of arrival. The updated trip information can be sent to the vehicle 202. In some examples, the additional stop associated with the destination of the user may be subsequently considered by transportation management system 244 when optimizing the fleet for responding to requests (e.g., by having the second vehicle attend to requests proximate the destination of the user).

Block 410 illustrates determining whether the estimated time of arrival changes for the user. In at least one example, if the updated trip information indicates a change for the estimated time of arrival, the transportation management system 244 can cause a new estimated time of arrival to be presented to the user, as illustrated in block 412. For example, the transportation management system 244 can send a notification to the user device 252 (e.g., push notification, email, text message, etc.) to indicate the new estimated time of arrival. In some examples, the transportation management system 244 can provide the updated trip information to the vehicle 202 and the trip management system 228 can cause the new estimated time of arrival to be presented via the emitter(s) 208 (or any other interface associated with the vehicle 202).

Block 414 illustrates determining whether the user accepts the new estimated time of arrival. In at least one example, if the estimated time of arrival changes for the user, the transportation management system 244 can prompt the user to confirm that he or she accepts the new estimated time. In some examples, the user can confirm acceptance of the new estimated time via an interaction with the application 258 and/or a display of the vehicle 202. In other examples, if the user remains proximate the vehicle 202 for more than a threshold amount of time, the transportation management system 244 can determine that the user accepts the new estimated time of arrival.

Block 416 illustrates controlling the second vehicle based at least in part on the updated trip information. In at least one example, the trip management system 228 can provide the updated trip information to the planning system 226. The planning system 226 can determine routes and/or trajectories to use to control the vehicle 202 based at least in part on the updated trip information, sensor data received from the sensor system(s) 206, and/or any determinations made by the perception system 222 and/or prediction system 224.

In at least one example, the planning system 226 can prioritize trip information associated with the occupant of the vehicle 202 such that the user is transported to a drop-off location of the occupant of the vehicle 202 prior to the intended destination of the user. In some examples, if the intended destination of the user is on the way to the drop-off location of the occupant and/or causes a deviation that is less than a threshold, the user may be dropped off prior to the occupant of the vehicle 202. In at least one example, the occupant may have to agree to such deviation, which can be done implicitly via selection of a shared-ride option.

Block 418 illustrates sending a response to the second vehicle and/or the user denying the user the ability to travel via the second vehicle. Based at least in part on determining that the user does not accept the new estimated time of arrival, the transportation management system 244 can send a response to the second vehicle (e.g., the vehicle 202) and/or the user (e.g., the user device 252) denying the user the ability to travel via the second vehicle. The user can then look to claim another vehicle in the same location or wait for their originally assigned vehicle (e.g., the first vehicle).

Figure 5:
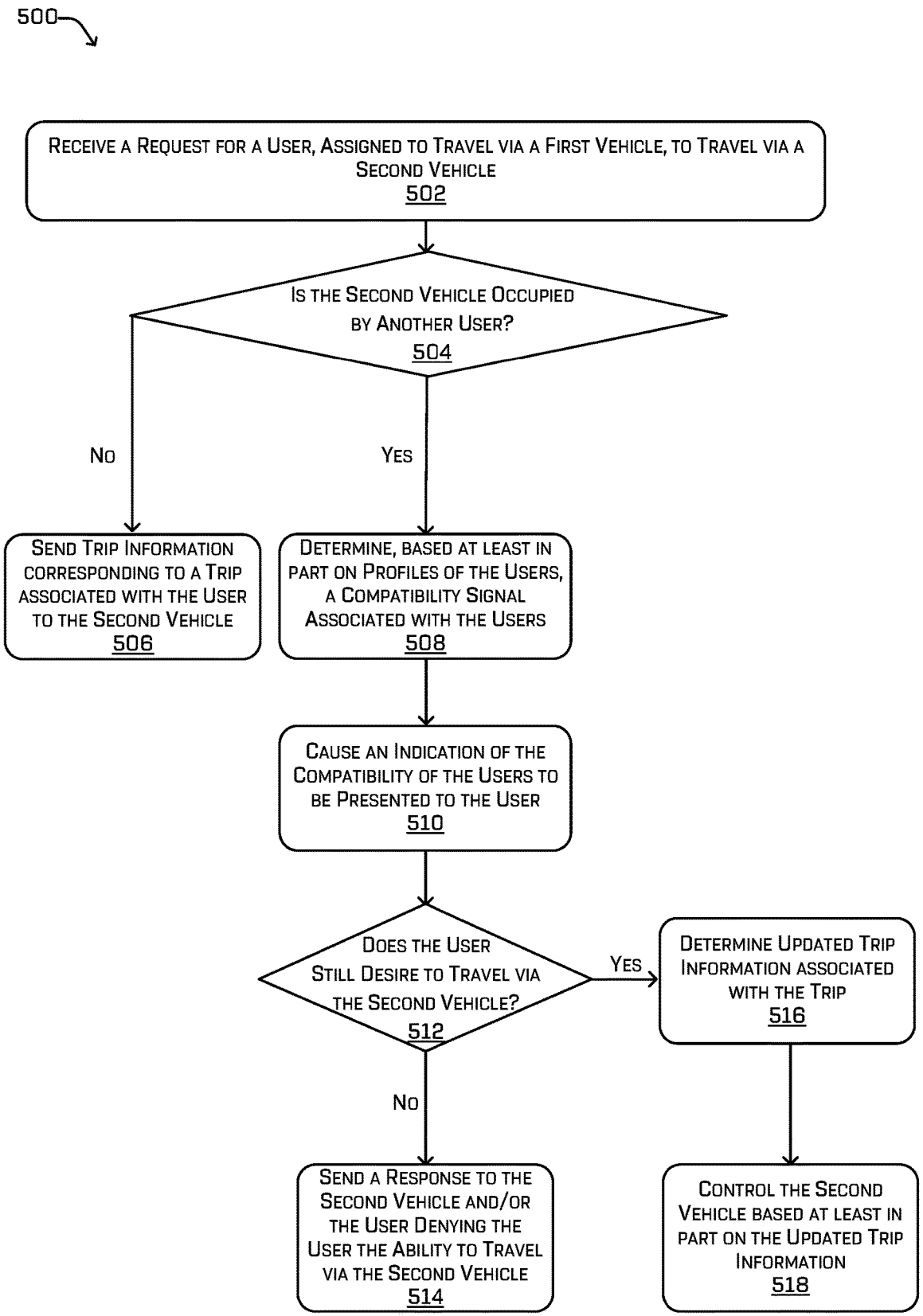
FIG. 5 illustrates an example process for presenting information to a user that is to be transported by a vehicle other than a vehicle to which the user was originally assigned when the other vehicle is already occupied by another user, as described herein.

FIG. 5 illustrates an example process 500 for presenting information to a user that is to be transported by a vehicle other than a vehicle to which the user was originally assigned when the other vehicle is already occupied by another user, as described herein.

Block 502 illustrates receiving a request for a user, assigned to travel via a first vehicle, to travel via a second vehicle. As described above with reference to block 310 of FIG. 3, the transportation management system 244 can receive a request from a user assigned to a first vehicle to travel via a second vehicle instead of the first vehicle. In at least one example, when a vehicle is associated with a nonspecific mode, any user can claim the vehicle thereby indicating that the user desires to travel via the vehicle. As described above, "claiming" a vehicle can refer to associating a trip of a user with the vehicle.

In some examples, the transportation management system 244 can receive, from a user device 252 of the user, an identifier associated with the second vehicle, such as the vehicle 202, which can indicate that the user intends to claim the second vehicle. That is, in some examples, the second request can be associated with an identifier of the vehicle 202, that can be input via the application 258 on the user device 252, as described above. In some examples, the vehicle 202 can receive an identifier associated with the user, the user device 252 of the user, and/or the trip, indicating that the user intends to claim the vehicle 202, through various mechanisms, as described above. In such examples, the vehicle 202 can provide the identifier to the transportation management system 244. In such examples, the second request can be associated with an identifier of the user, the user device of the user, and/or the trip. In some examples, the user may not send an explicit request, but a request can be inferred by the receipt of an identifier (e.g., of the vehicle, of the user, and/or of the trip).

Block 504 illustrates determining whether the second vehicle is occupied by another user. In at least one example, the vehicle 202 can be occupied by another user (or is already scheduled to service a request of another user). In some examples, the transportation management system 244 can determine that the vehicle 202 is occupied by another user based at least in part on knowing that the vehicle 202 is associated with another user and/or trip and where (e.g., location) along that trip the vehicle 202 is located. In some examples, the vehicle 202 can utilize the sensor system(s) 206 and/or emitter(s) 208 to determine whether another user is occupying the vehicle 202. In at least one example, the transportation management system 244 can determine whether the vehicle 202 is occupied by another user using one or more of the techniques described above.

When the vehicle 202 transitions to a nonspecific mode, the trip of the originally assigned user can take priority over the user who was not assigned to the vehicle 202, if the originally assigned user claims the vehicle 202 first.

Block 506 illustrates sending trip information corresponding to a trip associated with the user to the second vehicle. If the vehicle 202 is not occupied by another user, the transportation management system 244 can send trip information corresponding to the trip associated with the user to the vehicle 202 and the trip management system 228 can utilize the trip information to control the vehicle 202.

Block 508 illustrates determining, based at least in part on profiles of the users, a compatibility signal associated with the users. In at least one example, users can be associated with profiles, which can be stored in association with the computing device(s) 236 and/or user devices, such as the user device 252. In at least one example, a profile of a user can store data including, but not limited to, a name of the user, demographic information associated with the user (e.g., birthdate, age, gender, home address, work address, occupation, etc.), an identifier associated with the user and/or user device, biometric information associated with a user (e.g., photo, fingerprint(s), retinal scan, ear shape, etc.), a rating associated with the user, preferences of the user, etc. In at least one example, the transportation management system 244 can access profiles associated with each of the users (e.g., the occupant and the user) and can determine a compatibility signal indicative of the level of compatibility between the users. In at least one example, the transportation management system 244 can utilize a machine-learning algorithm to determine the compatibility signal for the users. In some examples, the compatibility signal can be a similarity metric (e.g., how similar are the users). In other examples, the compatibility signal can take into account more than similarity (e.g., user preferences, etc.), which can be learned by the machine-learning algorithm. That is, the compatibility signal can be indicative of the like-mindedness (e.g., regarding sympathy and friendship) and/or the ability of two users to exist together without problems or conflict.

Block 510 illustrates causing an indication of the compatibility of the users to be presented to the user. In at least one example, an indication of the compatibility of the users can be presented to the user. For instance, the transportation management system 244 can send a notification (e.g., push notification, email, text message, etc.) to the user device 252. The notification can include an indication of the compatibility of the users. In an example, the transportation management system 244 can provide the indication of the compatibility of the users to the vehicle 202 and the trip management system 228 can cause the indication of the compatibility of the users to be presented via the emitter(s) 208.

Block 512 illustrates determining whether the user still desires to travel via the second vehicle. In at least one example, the transportation management system 244 can prompt the user to confirm that he or she still desires to travel via the vehicle 202 in view of the compatibility with the occupant of the vehicle 202. In some examples, the user can confirm that he or she still desires to travel via the vehicle 202 via an interaction with the application 258 and/or a display of the vehicle 202. In other examples, if the user remains proximate the vehicle 202 for more than a threshold amount of time, the transportation management system 244 can determine that the user still desires to travel via the vehicle 202.

In some examples, the transportation management system 244 can refrain from causing the indication of compatibility to be presented to the user and/or requesting the user confirm that he or she still desires to travel via the vehicle 202 unless the compatibility signal indicates that the user is not compatible with the occupant of the vehicle 202. For example, if the compatibility signal is below a threshold the transportation management system 244 can cause the indication of compatibility to be presented to the user and/or can request that the user confirm that he or she still desires to travel via the vehicle 202. However, if the compatibility signal meets or exceeds a threshold, the transportation management system 244 can refrain from causing the indication of compatibility to be presented to the user and/or requesting the user confirm that he or she still desires to travel via the vehicle 202.

Block 514 illustrates sending a response to the second vehicle and/or the user denying the user the ability to travel via the second vehicle. Based at least in part on determining that the user does not desire to travel via the vehicle 202, the transportation management system 244 can send a response to the second vehicle (e.g., the vehicle 202) and/or the user (e.g., the user device 252) denying the user the ability to travel via the second vehicle. The user can then look to claim another vehicle in the same location or wait for their originally assigned vehicle (e.g., the first vehicle).

Block 516 illustrates determining updated trip information associated with the trip. In at least one example, based at least in part on the user confirming that he or she desires to travel via the vehicle 202, the transportation management system 244 can determine updated trip information associated with the trip of the user and the trip of the occupant. The transportation management system 244 can send the updated trip information to the vehicle 202, and the trip management system 228 can control the second vehicle based at least in part on the updated trip information, as illustrated in block 518. As described above, the planning system 226 can determine routes and/or trajectories to use to control the vehicle 202 based at least in part on the updated trip information, sensor data received from the sensor system(s) 206, and/or any determinations made by the perception system 222 and/or prediction system 224.

In at least one example, the planning system 226 can prioritize trip information associated with the occupant of the vehicle 202 such that the user is transported to a drop-off location of the occupant of the vehicle 202 prior to the intended destination of the user. However, if the intended destination of the user is on the way to the drop-off location of the occupant and/or causes a deviation that is less than a threshold, the user may be dropped off prior to the occupant of the vehicle 202. In at least one example, the occupant may have to agree to such deviation, which can be done implicitly via selection of a shared-ride option.

In both FIGS. 4 and 5, if a vehicle is already assigned to another user, the transportation management system 244 can perform one or more optimizations to determine whether to dispatch another vehicle for the other user and/or how to otherwise optimize the fleet of vehicles as a whole.

Figure 6:
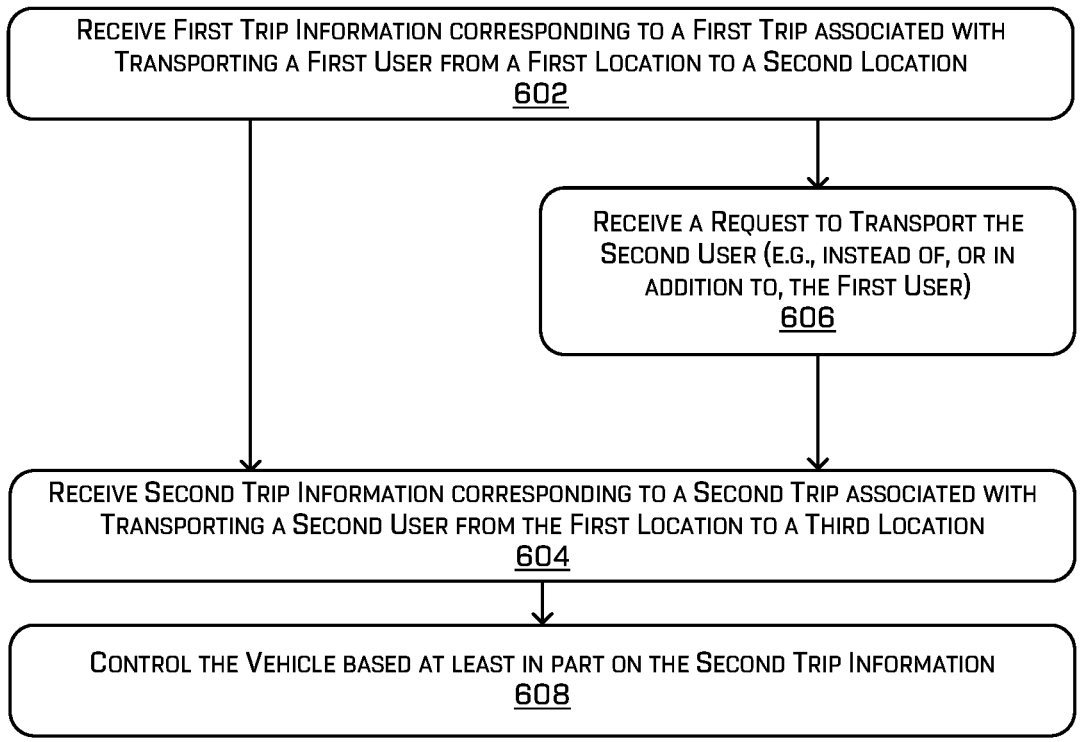
FIG. 6 illustrates an example process for controlling a nonspecific vehicle to transport a user other than a user originally assigned to the nonspecific vehicle, as described herein.

FIG. 6 illustrates an example process 600 for controlling a nonspecific vehicle to transport a user other than a user originally assigned to the nonspecific vehicle, as described herein.

Block 602 illustrates receiving first trip information corresponding to a first trip associated with transporting a first user from a first location to a second location. As described above with reference to FIG. 3, the transportation management system 244 can generate trip information associated with a trip that corresponds to a request from a user to travel from a first location to a second location. In at least one example, the transportation management system 244 can send trip information associated with a first trip to a vehicle 202. Such trip information can include the pick-up location, the intended destination (e.g., drop-off location), identification information associated with the user (e.g., a user identifier), a trip identifier, combinations of the foregoing, and the like. In such an example, the trip management system 228 can provide the first trip information to the planning system 226. As described above, the planning system 226 can determine routes and/or trajectories to use to control the vehicle 202 based at least in part on the first trip information, sensor data received from the sensor system(s) 206, and/or any determinations made by the perception system 222 and/or prediction system 224. In at least one example, the planning system 226 can cause the vehicle 202 to travel to the first location (e.g., to pick up the first user).

Block 604 illustrates receiving second trip information corresponding to a second trip associated with transporting a second user from the first location to a third location. In at least one example, at some time after the trip management system 228 receives the first trip information, the trip management system 228 can receive second trip information corresponding to a second trip that is associated with a different user (e.g., the second user). In some examples, the second trip information can be received after the vehicle 202 arrives at the first location or when the vehicle 202 is proximate the first location (e.g., within a threshold distance of the first location) and/or the second user. In at least one example, the trip management system 228 can receive the second trip information without having received and/or sent a previous request to transport the second user. For example, if a user inputs an identifier associated with the vehicle 202 into the application 258 on the user device 252 and the application 258 provides the identifier to the transportation management system 244, the transportation management system 244 can send the second trip information without the trip management system 228 having first received and/or sent a request.

However, in another example, the second trip information can be provided responsive to receiving a request to transport the second user.

Block 606 illustrates receiving a request to transport the second user (e.g., instead of, or in addition to, the first user). As described above, in at least one example, the trip management system 228 can receive an identifier associated with the user, the user device 252 of the user, and/or the trip, indicating that the user intends to claim the vehicle 202, through various mechanisms, which are described above with reference to block 310. In such an example, the trip management system 228 can provide the identifier (or an indication thereof) to the transportation management system 244. In such an example, the request can be associated with an identifier of the user, the user device 252 of the user, and/or the trip. In some examples, the user may not send an explicit request, but a request can be inferred by the receipt of an identifier (e.g., of the vehicle, of the user, and/or of the trip). In any event, the identifier (or an indication thereof) can be provided to the transportation management system 244, which can indicate a request to transport the second user via the vehicle 202.

As described above with reference to FIG. 3, responsive to receiving the request from the second user, the transportation management system 244 can send second trip information associated with the second trip corresponding to the second user to the trip management system 228.

Block 608 illustrates controlling the vehicle based at least in part on the second trip information. In such an example, the trip management system 228 can provide the second trip information to the planning system 226. As described above, the planning system 226 can determine routes and/or trajectories to use to control the vehicle 202 based at least in part on the second trip information, sensor data received from the sensor system(s) 206, and/or any determinations made by the perception system 222 and/or prediction system 224. In at least one example, the planning system 226 can cause the vehicle 202 to travel to the first location (e.g., to pick up the first user).

In some examples, the vehicle 202 can be occupied by the first user when the second user attempts to claim the vehicle 202. In such examples, techniques described above with reference to FIGS. 4 and 5 can be used to present information to the second user to enable the second user to determine whether he or she wants to claim the vehicle 202. In at least one example, the vehicle 202 may not be claimed by the second user until the second user affirmatively indicates that he or she claims the vehicle 202. That is, the vehicle 202 can remain claimed by the first user until the second user confirms his or her desire to claim the vehicle 202. In at least one example, when the vehicle 202 is claimed by both the first user and the second user, the trip management system 228 can prioritize the first trip instructions over the second trip instructions. In some examples, when the vehicle 202 is claimed by both the first user and the second user, the trip management system 228 can integrate the first trip instructions and the second trip instructions to control the vehicle 202.

As described above, in an example, a user may not have requested a ride and may claim the vehicle 202 without having requested a ride. In such an example, a trip has not yet been associated with the user and/or there is no trip identifier available for the user. Nevertheless, if the vehicle 202 is associated with a nonspecific mode, the user can still hail a ride from the vehicle 202. In such an example, the user can interact with a display, an audio system (e.g., microphone and/or speaker), and/or another interface associated with the vehicle 202 to provide an intended destination (e.g., drop-off location) and the vehicle 202 can send the intended destination (e.g., drop-off location) to the service provider. The trip management module 244 can generate a trip associated with transporting the user from a current location to an intended destination (e.g., drop-off location) and can send trip information corresponding to the trip to the vehicle 202. In such an example, the vehicle 202 may not receive the first trip information and instead, process 600 may begin at block 604.

Figure 7:
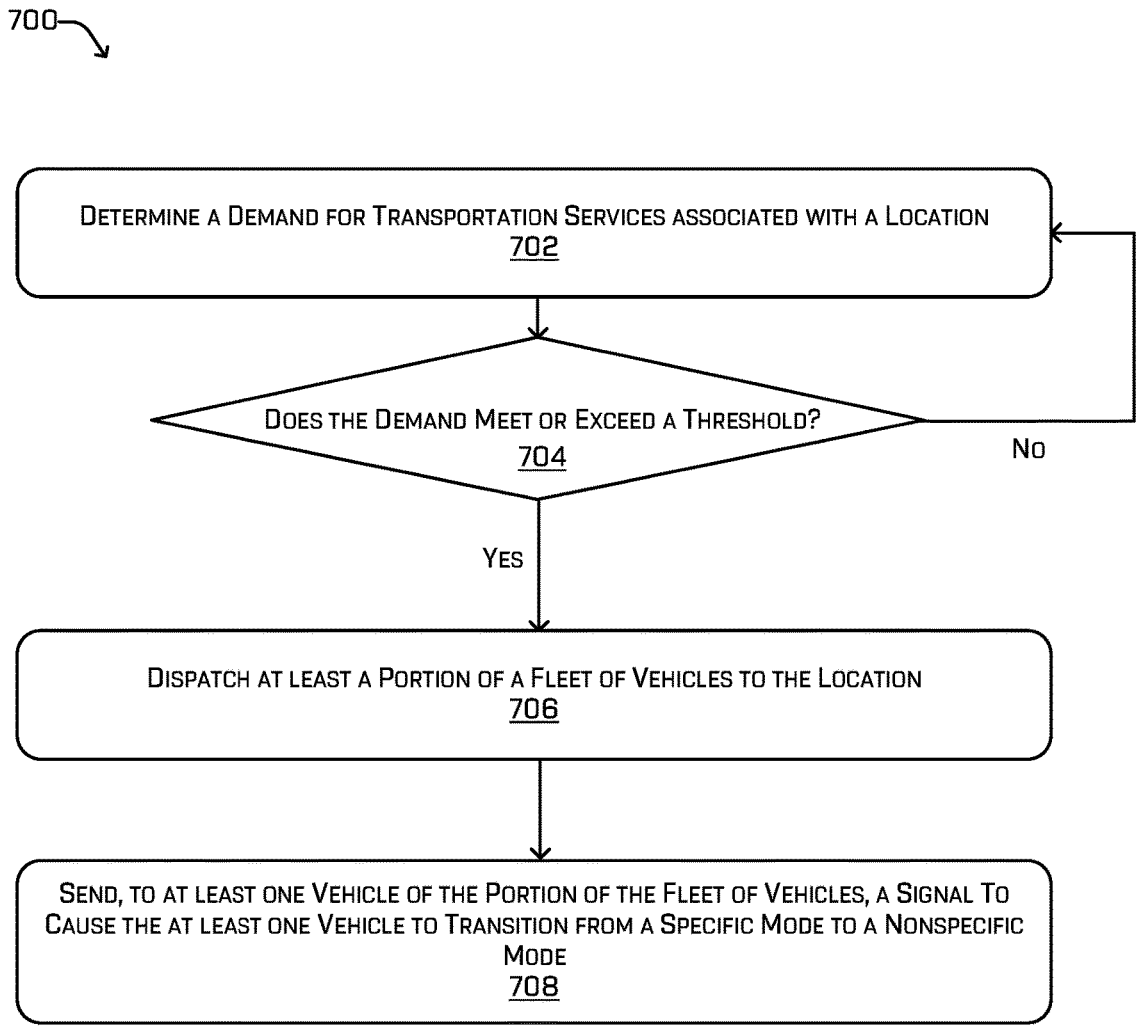
FIG. 7 illustrates an example process for dispatching vehicle(s) based at least in part on a determined demand, as described herein.

FIG. 7 illustrates an example process 700 for dispatching vehicle(s) based at least in part on a determined demand, as described herein.

Block 702 illustrates determining a demand for transportation services associated with a location. In at least one example, the transportation management system 244 can utilize historical data associated with transportation requests, current transportation requests, calendar data, etc. to determine a demand associated with a particular location serviced by the fleet of vehicles. For example, the transportation management system 244 can receive data associated with previous transportation requests (e.g., historical data). Such historical data can indicate a pick-up location with a request, a drop-off location associated with the request, a vehicle identifier associated with the request, a time associated with the pick-up, a time associated with the drop-off, a length of the associated trip, a rating associated with the trip, the user, and/or the vehicle, a date associated with the request, etc. Furthermore, the transportation management system 244 can receive current transaction requests, such as requests that are currently being received and/or are associated with trips that have not yet been completed. Moreover, in at least one example, the transportation management system 244 can receive calendar data indicative of events such as concerts, festivals, sporting events, festivals, and the like.

In at least one example, the transportation management system 244 can analyze the historical data, current transportation requests, calendar data, etc. to determine a demand associated with transportation services provided by the service provider in a particular location. For the purpose of this discussion, a "location" can refer to a general area associated with location. That is, in some examples, "location" can refer to a particular point in an environment or an area around the particular point. In some examples, the transportation management system 244 can utilize a machine-learning algorithm to determine the demand. In other examples, the transportation management system 244 can utilize statistics, heuristics, or other indicators to determine the demand. In at least one example, the demand can be associated with a score or another indicator indicating a relative level of the demand.

In at least one example, the determined demand can be known, for instance, based at least in part on current transportation requests and/or calendar data. In other examples, the determined demand can be anticipated, for instance, based at least in part on historical data and/or calendar data. Further, in some examples, the determined demand can be emerging such that the historical data, current transportation requests, and/or calendar data indicate a trend in transportation requests. That trend can indicate that the demand is likely to increase as time progresses.

Block 704 illustrates determining whether the demand meets or exceeds a threshold. In at least one example, the transportation management system 244 can compare the demand associated with the location to a threshold to determine whether the demand meets or exceeds the threshold. In at least one example, if the demand meets or exceeds a threshold, the transportation management system 244 can dispatch at least a portion of a fleet of vehicles to the location, as illustrated in block 706. In such an example, the transportation management system 244 can send an instruction to individual vehicles in the fleet of vehicles to cause the individual vehicles to travel to the location. Such an instruction can include the location, or a pick-up location associated with the location. In some examples, such vehicles may not be associated with another trip and/or user. In other examples, one or more of the vehicles may be associated with a trip that starts at the location.

In at least one example, the transportation management system 244 can dispatch vehicle(s) responsive to a known demand (e.g., reactively). In some examples, the transportation management system 244 can dispatch vehicle(s) based at least in part on an anticipated and/or emerging demand. In such examples, the vehicle(s) can be dispatched proactively, before transportation requests are received.

Block 708 illustrates sending, to at least one vehicle of the portion of the fleet of vehicles, a signal to cause the at least one vehicle to transition from a specific mode to a nonspecific mode. Based at least in part on determining that the demand meets or exceeds the threshold, the transportation management system 244 can send a signal to one or more of the vehicles to cause the vehicles to transition from the specific mode to the nonspecific mode. In some examples, such a signal can be sent to each of the vehicles in the portion of the fleet of vehicles dispatched to the location. In some examples, such a signal can be sent to individual vehicles associated with pick-up locations that correspond to the location. As a result, vehicles arriving at the location can be associated with a nonspecific mode and any user can utilize the vehicles on a first-come, first-served basis, or by sharing a ride (e.g., if both users claim a vehicle at the same time).

In some examples, responsive to such a signal being sent out, the transportation management system 244 can send a notification to users proximate to the location and/or who have submitted requests for pick-up at the location to notify the users that they can utilize any vehicle and need not wait for the vehicle assigned to them.

In at least one example, some vehicles are not permitted to transition to the nonspecific mode, as described above. In such an example, such vehicles may not receive the signal to transition from the specific mode to the nonspecific mode.

Figure 8:
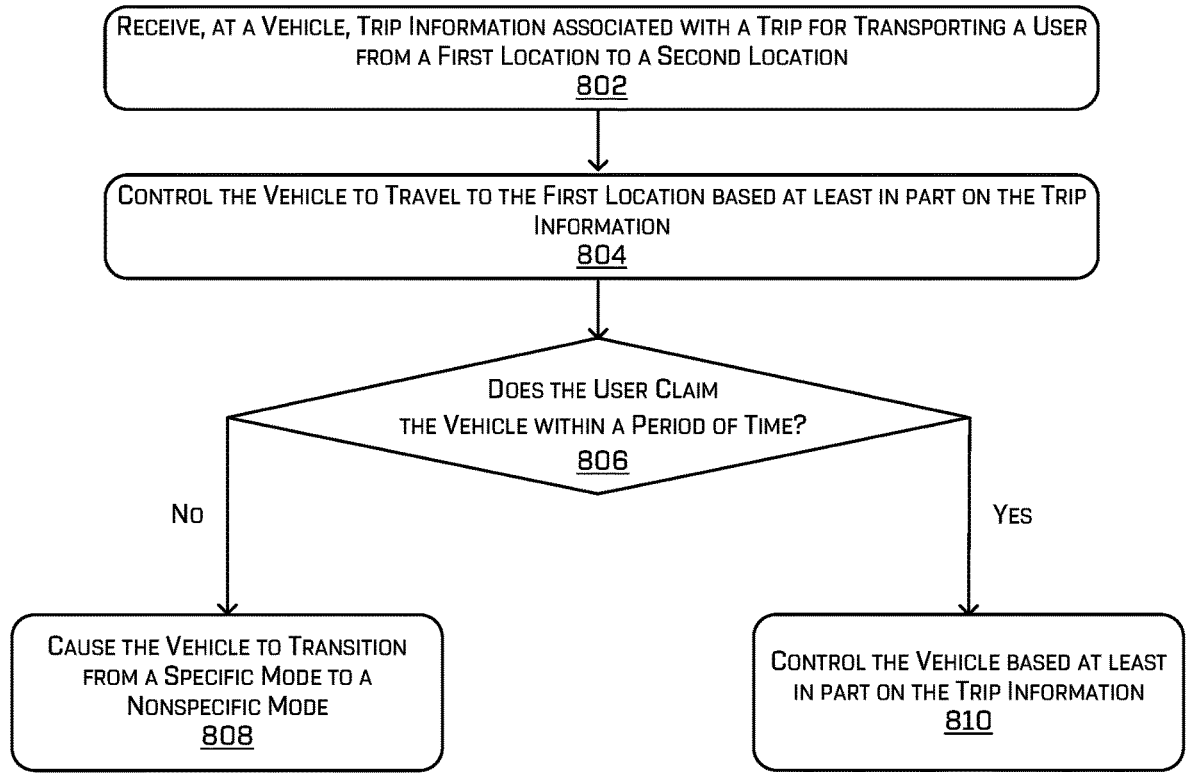
FIG. 8 illustrates an example process for causing a vehicle to transition from a specific mode to a nonspecific mode, as described herein.

FIG. 8 illustrates an example process 800 for causing a vehicle to transition from a specific mode to a nonspecific mode, as described herein.

Block 802 illustrates receiving, at a vehicle, trip information associated with a trip for transporting a user from a first location to a second location. As described above with reference to FIG. 3, the transportation management system 244 can generate trip information associated with a trip that corresponds to a request from a user to travel from a first location to a second location. In at least one example, the transportation management system 244 can send trip information associated with a trip to a vehicle 202. Such trip information can include the pick-up location, the intended destination (e.g., drop-off location), identification information associated with the user (e.g., a user identifier), a trip identifier, combinations of the foregoing, and the like. In such an example, the trip management system 228 can provide the trip information to the planning system 226. As described above, the planning system 226 can determine routes and/or trajectories to use to control the vehicle 202 based at least in part on the trip information, as illustrated in block 804, sensor data received from the sensor system(s) 206, and/or any determinations made by the perception system 222 and/or prediction system 224. In at least one example, the planning system 226 can cause the vehicle 202 to travel to the first location (e.g., to pick up the first user).

Block 806 illustrates determining whether the user claims the vehicle within a period of time. In at least one example, the vehicle 202 can be associated with the specific mode such that the vehicle 202 can only be claimed by the user assigned to the vehicle 202. In such an example, the user can have a period of time to claim the vehicle 202, for example, after the vehicle 202 arrives at the first location. That is, the vehicle 202 can be reserved for the originally assigned user for the period of time. If the user does not claim the vehicle 202 prior to the lapse of the period of time, the trip management system 228 can cause the vehicle to transition from a specific mode to a nonspecific mode, as illustrated in block 808. As a result, another user can claim the vehicle 202 via techniques described herein.

In some examples, the trip management system 228 can send an indication that the vehicle 202 has not been claimed within the period of time to the transportation management system 244 and the transportation management system 244 can send a signal to cause the vehicle 202 to transition from the specific mode to the nonspecific mode. In other examples, the trip management system 228 can effectuate the transition (e.g., without receiving a signal from the transportation management system 244) and can send an indication of such to the transportation management system 244.

Block 810 illustrates controlling the vehicle based at least in part on the trip information. If the user claims the vehicle 202 within the period of time, the trip management system 228 can provide the trip information to the planning system 226. As described above, the planning system 226 can determine routes and/or trajectories to use to control the vehicle 202 based at least in part on the trip information, sensor data received from the sensor system(s) 206, and/or any determinations made by the perception system 222 and/or prediction system 224.

Example Clauses

A. A system comprising: one or more processors; and one or more non-transitory computer-readable media storing indications, that when executed by the one or more processors, cause the system to perform operations comprising: receiving, from a device of a user, a request to transport the user from a first location to a second location; generating a trip associated with transporting the user from the first location to the second location; sending trip information corresponding to the trip to a first vehicle of a fleet of vehicles; receiving, from a second vehicle of the fleet of vehicles, an identifier associated with at least one of the user, the device of the user, or the trip; and sending the trip information corresponding to the trip to the second vehicle to cause a computing system associated with the second vehicle to control the second vehicle to transport the user to the second location.

B. The system as paragraph A recites, wherein the identifier is received, from the second vehicle, in association with at least one of: image data or a code representing the identifier; an indication associated with a touch input via an interface of the second vehicle; or audio data representing a spoken input.

C. The system as paragraph A or B recites, the operations further comprising: sending, at a first time and responsive to receiving the request, identification information associated with the first vehicle to the device of the user; and receiving the identifier from the second vehicle at a second time after the first time.

D. The system as any of paragraphs A—C recites, further comprising: determining that an assigned user originally assigned to the second vehicle has not utilized the second vehicle within a period of time for which the second vehicle is reserved for the assigned user; and sending a signal to the second vehicle to enable the second vehicle to be utilized by another user different than the assigned user based at least in part on determining that the assigned user has not utilized the second vehicle within the period of time.

E. A method comprising: receiving a request for a user to travel via a vehicle of a fleet of vehicles, the request comprising information indicative of the user, and a device of the user and the vehicle being within a threshold proximity of one another in a first location; and sending, to the vehicle, trip information corresponding to a trip to transport the user from the first location to a second location, the trip information causing a computing system associated with the vehicle to control the vehicle to transport the user to the second location.

F. The method as paragraph E recites, wherein the vehicle is assigned to another user at the time the request is received, the method further comprising causing the computing system to control the vehicle to transport the user to the second location instead of a third location associated with the other user.

G. The method as paragraph F recites, further comprising assigning another vehicle of the fleet of vehicles to another trip associated with the other user.

H. The method as any of paragraphs E-G recites, wherein the vehicle is assigned to another user at the time the request is received, the method further comprising causing the computing system to control the vehicle to transport the user to the second location in addition to a third location associated with the other user.

I. The method as any of paragraphs E-H recites, wherein the request is received from the computing system associated with the vehicle and the information indicative of the user comprises an identifier that is associated with at least one of the user, the device of the user, or the trip.

J. The method as any of paragraphs E-I recites, wherein the request is received based at least in part on an input of the first location to an interface associated with the vehicle.

K. The method as any of paragraphs E-J recites, wherein the request is received from the device of the user and the request is associated with an identifier of the vehicle.

L. The method as any of paragraphs E-K recites, further comprising: receiving, prior to receiving the request, another request from the device of the user, wherein the other request indicates a desire for the user to travel from the first location to the second location; assigning another vehicle to the user; and sending additional trip information to the device of the user, wherein the additional trip information includes at least one of an estimated time of pick-up at the first location by the other vehicle, an estimated time of arrival at the second location when transported by the other vehicle, identification information associated with the other vehicle, or a trip identifier.

M. The method as paragraph L recites, further comprising sending, responsive to receiving the request, updated trip information to the device of the user, wherein the updated trip information includes an estimated time of arrival at the second location when transported by the vehicle.

N. One or more non-transitory computer-readable media storing indications, that when executed by one or more processors, cause a computing system to perform operations comprising: receiving a request for a user to travel via a vehicle of a fleet of vehicles, the request comprising information indicative of the user, and a device of the user and the vehicle being within a threshold proximity of one another in a first location; and sending, to the vehicle, trip information corresponding to a trip to transport the user from the first location to a second location, the trip information causing a computing system associated with the vehicle to control the vehicle to transport the user to the second location.

O. The one or more non-transitory computer-readable media as paragraph N recites, the operations further comprising: determining that the vehicle is already occupied by another user; determining an estimated time of arrival at the second location, based at least in part on another trip associated with the other user; and causing the estimated time of arrival to be presented via at least one of the device of the user or an interface associated with the vehicle.

P. The one or more non-transitory computer-readable media as paragraph O recites, the operations further comprising: receiving, based at least in part on causing the estimated time of arrival to be presented via at least one of the device of the user or the interface associated with the vehicle, an indication that the user confirms the request; and sending the trip information to the vehicle based at least in part on receiving the indication that the user confirms the request.

Q. The one or more non-transitory computer-readable media as any of paragraphs N-P recites, the operations further comprising: determining that the vehicle is already occupied by another user; determining a compatibility signal between the user and the other user; and causing the compatibility signal to be presented via at least one of the device of the user or an interface associated with the vehicle.

R. The one or more non-transitory computer-readable media as any of paragraphs N-Q recites, the operations further comprising: determining a demand associated with transportation services available via the fleet of vehicles, wherein the demand is associated with a particular location; determining that the demand meets or exceeds a threshold; and dispatching at least a portion of the fleet of vehicles to the particular location based at least in part on the demand meeting or exceeding the threshold.

S. The one or more non-transitory computer-readable media as any of paragraphs N-R recites, the operations further comprising: determining a number of requests for vehicles associated with a same location; determining that the number of requests meets or exceeds a threshold; and sending, to at least the vehicle, a signal to enable the vehicle to transition from a first mode, whereby the vehicle can only be utilized by an assigned user, to a second mode, whereby the vehicle is capable of being utilized by users other than the assigned user on a first-come, first-served basis.

T. The one or more non-transitory computer-readable media as any of paragraphs N-S recites, wherein the request is associated with an identifier of at least one of the user, the device of the user, the trip, or the vehicle.

U. A vehicle comprising: one or more processors; and one or more non-transitory computer-readable media storing indications, that when executed by the one or more processors, cause the vehicle to perform operations comprising: receiving, from one or more computing devices at a first time, first trip information associated with a first trip for transporting a first user from a first location to a second location; receiving, at a second time after the first time, an identifier associated with a second user; sending the identifier to the one or more computing devices; receiving, from the one or more computing devices and based at least in part on sending the identifier to the one or more computing devices, second trip information associated with a second trip to transport the second user from the first location to a third location; and controlling the vehicle to drive along a route between the first location and the third location based at least in part on the second trip information.

V. The vehicle as paragraph U recites, wherein receiving the identifier comprises receiving the identifier from a device of the second user, when the device of the second user is within a threshold proximity of the vehicle.

W. The vehicle as paragraph U or V recites, wherein receiving the identifier comprises capturing the identifier or a code representing the identifier from a device of the second user via a sensor associated with the vehicle.

X. The vehicle as any of paragraphs U-W recites, wherein receiving the identifier comprises at least one of: receiving a touch input of the identifier into an interface associated with the vehicle; or receiving a spoken input of the identifier into an audio system associated with the vehicle.

Y. A method comprising: receiving, at a vehicle and from one or more computing devices at a first time, first trip information associated with a first trip for transporting a first user from a first location to a second location, wherein the vehicle is associated with a first mode that enables users other than an originally assigned user to utilize the vehicle; receiving, at the vehicle and from the one or more computing devices at a second time after the first time, second trip information associated with a second trip corresponding to a second user, wherein the second trip is associated with the first location and a third location and the second trip information is received when the vehicle is within a threshold distance of a device of the second user; and controlling the vehicle to drive along a route between the first location and the third location based at least in part on the second trip information.

Z. The method as paragraph Y recites, further comprising receiving, from the one or more computing devices, a signal to cause the vehicle to transition from the first mode to a second mode, wherein, when in the second mode, the vehicle is not capable of being utilized by users other than an originally assigned user.

AA. The method as paragraph Y or Z recites, further comprising: determining that the first user does not utilize the vehicle within a period of time from when the vehicle arrives at the first location; and transitioning to the first mode based at least in part on determining that the first user does not utilize the vehicle within the period of time.

AB. The method as any of paragraphs Y-AA recites, further comprising: receiving, from the device of the second user, an identifier associated with at least one of the second user, a device of the second user, or the second trip; and receiving the second trip information responsive to sending the identifier to the one or more computing devices.

AC. The method as paragraph AB recites, wherein receiving the identifier from the device of the second user comprises receiving the identifier directly from the device of the second user via a BLUETOOTH® network or a Near Field Communication (NFC) network.

AD. The method as paragraph AB or AC recites, further comprising: receiving the identifier via a sensor associated with the vehicle; and receiving the second trip information responsive to sending the identifier to the one or more computing devices.

AE. The method as any of paragraphs Y-AD recites, further comprising: receiving an identifier associated with at least one of the second user, a device of the second user, or the second trip via at least one of a touch input into an interface associated with the vehicle or a spoken input into an audio system associated with the vehicle; and receiving the second trip information responsive to sending the identifier to the one or more computing devices.

AF. The method as any of paragraphs Y-AE recites, further comprising: receiving an indication of at least the third location via an interface associated with the vehicle; and receiving the second trip information responsive to sending the indication of the third location to the one or more computing devices.

AG. The method as any of paragraphs Y-AF recites, wherein, at the time the second trip information is received, the vehicle is already occupied by another user, the method further comprising presenting information via an interface associated with the vehicle based at least in part on the vehicle being occupied by the other user.

AH. The method as paragraph AG recites, wherein the information includes at least one of an estimated time of arrival at the third location or a compatibility signal representative of a compatibility of the second user and the other user.

AI. One or more non-transitory computer-readable media storing indications, that when executed by one or more processors, cause a vehicle to perform operations comprising: receiving, at a vehicle and from one or more computing devices, trip information associated with a trip for transporting a user from a first location to a second location, wherein the vehicle is associated with a first mode that enables users other than an originally assigned user to utilize the vehicle and the vehicle is within a threshold distance of a device of the user; and controlling the vehicle to drive along a route between the first location and the second location based at least in part on the trip information.

AJ. The one or more non-transitory computer-readable media as paragraph AI recites, the operations further comprising: receiving, from the device of the user, an identifier associated with at least one of the user, the device of the user, or the trip; and receiving the trip information responsive to sending the identifier to the one or more computing devices.

AK. The one or more non-transitory computer-readable media as paragraph AJ recites, wherein the identifier is received directly from the device of the user via least one of: receiving the identifier or a code representative of the identifier via a sensor associated with the vehicle; receiving a touch input of the identifier via an interface associated with the vehicle; or receiving a spoken input of the identifier via an audio system associated with the vehicle.

AL. The one or more non-transitory computer-readable media as any of paragraphs AI-AK recites, the operations further comprising: receiving an indication of at least the second location via an interface associated with the vehicle; and receiving the trip information responsive to sending the indication of the second location to the one or more computing devices.

AM. The one or more non-transitory computer-readable media as any of paragraphs AI-AL recites, wherein, at the time the trip information is received, the vehicle is already occupied by another user, the operations further comprising presenting information associated with at least one of (i) an estimated time of arrival based at least in part on the vehicle being occupied by another user or (ii) a compatibility of the user and the other user via an interface associated with the vehicle.

AN. The one or more non-transitory computer-readable media as paragraph AM recites, the operations further comprising: receiving, based at least in part on presenting the information via the interface associated with the vehicle, an indication that the user confirms the desire to travel via the vehicle; and sending the trip information to the vehicle based at least in part on receiving the indication that the user confirms the desire to travel via the vehicle.

While the example clauses described above are described with respect to one particular implementation, it should be understood that, in the context of this document, the content of the example clauses can also be implemented via a method, device, system, a computer-readable medium, and/or another implementation. Additionally, any of examples A-AN may be implemented alone or in combination with any other one or more of the examples A-AN.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
one or more processors; and
one or more non-transitory computer-readable media storing indications, that when executed by the one or more processors, cause the vehicle to perform operations comprising:
receiving, from one or more computing devices at a first time, first trip information associated with a first trip for transporting a first user from a first location to a second location;
receiving, at a second time after the first time, an identifier associated with a second user;
sending the identifier to the one or more computing devices;
receiving, from the one or more computing devices and based at least in part on sending the identifier to the one or more computing devices, second trip information associated with a second trip to transport the second user from the first location to a third location;
controlling the vehicle to drive along a route between the first location and the third location based at least in part on the second trip information; and
receiving, from the one or more computing devices, a signal to cause the vehicle to transition from a first mode to a second mode, wherein, when in the second mode, the vehicle is not capable of being utilized by users other than an originally assigned user.

2. The vehicle as claim 1 recites, wherein receiving the identifier comprises receiving the identifier from a device of the second user, when the device of the second user is within a threshold proximity of the vehicle.

3. The vehicle as claim 1 recites, wherein receiving the identifier comprises capturing the identifier or a code representing the identifier from a device of the second user via a sensor associated with the vehicle.

4. The vehicle as claim 1 recites, wherein receiving the identifier comprises at least one of:
receiving a touch input of the identifier into an interface associated with the vehicle; or
receiving a spoken input of the identifier into an audio system associated with the vehicle.

5. A method comprising:
receiving, at a vehicle and from one or more computing devices at a first time, first trip information associated with a first trip for transporting a first user from a first location to a second location, wherein the vehicle is associated with a first mode that enables users other than an originally assigned user to utilize the vehicle;
receiving, at the vehicle and from the one or more computing devices at a second time after the first time, second trip information associated with a second trip corresponding to a second user, wherein the second trip is associated with the first location and a third location and the second trip information is received when the vehicle is within a threshold distance of a device of the second user;
controlling the vehicle to drive along a route between the first location and the third location based at least in part on the second trip information; and
receiving, from the one or more computing devices, a signal to cause the vehicle to transition from the first mode to a second mode, wherein, when in the second mode, the vehicle is not capable of being utilized by users other than an originally assigned user.

6. The method as claim 5 recites, further comprising:
determining that the first user does not utilize the vehicle within a period of time from when the vehicle arrives at the first location; and
transitioning to the first mode based at least in part on determining that the first user does not utilize the vehicle within the period of time.

7. The method as claim 5 recites, further comprising:
receiving, from the device of the second user, an identifier associated with at least one of the second user, a device of the second user, or the second trip; and
receiving the second trip information responsive to sending the identifier to the one or more computing devices.

8. The method as claim 7 recites, wherein receiving the identifier from the device of the second user comprises receiving the identifier directly from the device of the second user via a BLUETOOTH® network or a Near Field Communication (NFC) network.

9. The method as claim 7 recites, further comprising:
receiving the identifier via a sensor associated with the vehicle; and
receiving the second trip information responsive to sending the identifier to the one or more computing devices.

10. The method as claim 5 recites, further comprising:
receiving an identifier associated with at least one of the second user, a device of the second user, or the second trip via at least one of a touch input into an interface associated with the vehicle or a spoken input into an audio system associated with the vehicle; and
receiving the second trip information responsive to sending the identifier to the one or more computing devices.

11. The method as claim 5 recites, further comprising:
receiving an indication of at least the third location via an interface associated with the vehicle; and
receiving the second trip information responsive to sending the indication of the third location to the one or more computing devices.

12. The method as claim 5 recites, wherein, at the second time the second trip information is received, the vehicle is already occupied by another user, the method further comprising presenting information via an interface associated with the vehicle based at least in part on the vehicle being occupied by the other user.

13. The method as claim 12 recites, wherein the information includes at least one of an estimated time of arrival at the third location or a compatibility signal representative of a compatibility of the second user and the other user.

14. One or more non-transitory computer-readable media storing indications, that when executed by one or more processors, cause a vehicle to perform operations comprising:
receiving, at a vehicle and from one or more computing devices, trip information associated with a trip for transporting a user from a first location to a second location, wherein the vehicle is associated with a first mode that enables users other than an originally assigned user to utilize the vehicle and the vehicle is within a threshold distance of a device of the user;
controlling the vehicle to drive along a route between the first location and the second location based at least in part on the trip information;
receiving, from the one or more computing devices, a signal to cause the vehicle to transition from the first mode to a second mode, wherein, when in the second mode, the vehicle is not capable of being utilized by users other than an originally assigned user.

15. The one or more non-transitory computer-readable media as claim 14 recites, the operations further comprising:
receiving, from the device of the user, an identifier associated with at least one of the user, the device of the user, or the trip; and
receiving the trip information responsive to sending the identifier to the one or more computing devices.

16. The one or more non-transitory computer-readable media as claim 15 recites, wherein the identifier is received directly from the device of the user via least one of:
receiving the identifier or a code representative of the identifier via a sensor associated with the vehicle;
receiving a touch input of the identifier via an interface associated with the vehicle; or
receiving a spoken input of the identifier via an audio system associated with the vehicle.

17. The one or more non-transitory computer-readable media as claim 14 recites, the operations further comprising:
receiving an indication of at least the second location via an interface associated with the vehicle; and
receiving the trip information responsive to sending the indication of the second location to the one or more computing devices.

18. The one or more non-transitory computer-readable media as claim 14 recites, wherein, at a time the trip information is received, the vehicle is already occupied by another user, the operations further comprising presenting information associated with at least one of (i) an estimated time of arrival based at least in part on the vehicle being occupied by another user or (ii) a compatibility of the user and the other user via an interface associated with the vehicle.

19. The one or more non-transitory computer-readable media as claim 18 recites, the operations further comprising:
receiving, based at least in part on presenting the information via the interface associated with the vehicle, an indication that the user confirms a desire to travel via the vehicle; and
sending the trip information to the vehicle based at least in part on receiving the indication that the user confirms the desire to travel via the vehicle.

20. The vehicle as claim 1 recites, wherein the identifier associated with the second user and the second trip information associated with the second trip are received based on the first mode.

* * * * *